US012652423B2

(12) United States Patent
Denoual et al.

(10) Patent No.: US 12,652,423 B2
(45) Date of Patent: Jun. 9, 2026

(54) METHOD, DEVICE, AND COMPUTER PROGRAM FOR OPTIMIZING DYNAMIC ENCAPSULATION AND PARSING OF CONTENT DATA

(71) Applicant: CANON KABUSHIKI KAISHA, Tokyo (JP)

(72) Inventors: Franck Denoual, Saint Domineuc (FR); Naël Ouedraogo, Val d'Anast (FR); Frédéric Maze, Langan (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/881,644

(22) PCT Filed: Jul. 3, 2023

(86) PCT No.: PCT/EP2023/068231
§ 371 (c)(1),
(2) Date: Jan. 6, 2025

(87) PCT Pub. No.: WO2024/012915
PCT Pub. Date: Jan. 18, 2024

(65) Prior Publication Data
US 2025/0317612 A1       Oct. 9, 2025

(30) Foreign Application Priority Data

Jul. 11, 2022    (GB) ................................... 2210190.1
Oct. 17, 2022    (GB) ................................... 2215334.0

(51) Int. Cl.
*H04N 21/236*          (2011.01)
*H04N 21/81*           (2011.01)
(52) U.S. Cl.
CPC ........... *H04N 21/236* (2013.01); *H04N 21/81* (2013.01)

(58) Field of Classification Search
None
See application file for complete search history.

(56) References Cited

U.S. PATENT DOCUMENTS

2018/0007407 A1    1/2018   Maze
2019/0394537 A1    12/2019  Chen

FOREIGN PATENT DOCUMENTS

GB          2608399 A       1/2023
WO      2011038013 A2       3/2011
(Continued)

OTHER PUBLICATIONS

Information technology—Coding of audio-visual objects—Part 12: ISO base media file format, ISO/IEC 14496-12:2022, Jan. 25, 2022,XP082032879.

*Primary Examiner* — Rong Le
(74) *Attorney, Agent, or Firm* — Canon U.S.A., Inc. IP Division

(57) ABSTRACT

A method for encapsulating media data of several presentations file. After having obtained a portion of media data of a first presentation, the first portion, the first presentation consisting of a first set of tracks, first metadata describing tracks of the first set of tracks are encapsulated and the first portion is encapsulated into one or more first media fragments. After obtaining a portion of media data of a second presentation, the second portion, the second presentation consisting of a second set of tracks, second metadata describing tracks of the second set of tracks are encapsulated into one or more second media fragments following the first media fragments and the second portion is encapsulated into the one or more second media fragments. The second metadata include an indication to signal that the second set of tracks does not comprise at least one track as described in the encapsulated first metadata.

20 Claims, 16 Drawing Sheets

(56)     References Cited

FOREIGN PATENT DOCUMENTS

| | | | |
|---|---|---|---|
| WO | 2011038021 | A1 | 3/2011 |
| WO | 2014004955 | A1 | 1/2014 |

```
aligned(8) class DynamicMovieBox extends FullBox('dymv', version=0,
flags) {
  if (flags & 1) {
    unsigned int(32) source_id;                        604
    unsigned int(32) source_flags;              605
  }
                                          601
  DynamicTrackBox ('dytk')                    // optional: zero or more
                                          620
  UserDataBox ('udat' as in ISOBMFF)          // optional: zero or one
                                          630
  MetaBox ('meta' as in ISOBMFF)              // optional: zero or one
}
```

600

```
aligned(8) class DynamicTrackBox extends Box('dytk'){
  DynamicTrackHeaderBox dyn_tkhd;//mandatory, must be first
  SampleDescriptionBox stsd;//conditionally mandatory
  Box minf_header_info; //optional, one of vmhd, smhd, sthd, hmhd, vvhd
  DataInformationBox data_info; //optional, if not set data is in fragment
  UserDataBox udta; //optional
  MetaBox meta; //optional
  TrackReferenceBox tref; //optional
  TrackGroupBox trgr; //optional
}
```

```
aligned(8) class DynamicTrackHeaderBox extends FullBox('dtkh', version=0, flags){
    unsigned int(32) track_ID;
    if ( ! (flags & 1)) {
        if (flags & 2) unsigned int(32) modification_flags;
        unsigned int(32) handler_type;
        unsigned int(32) media_timescale;
        if (flags & 4)      signed int(32) delay ;
        if (flags & 8)      unsigned int(24) track_flags;
        bit(1) lang_3cc;
        if (lang_3cc)     unsigned int(5)[3] language; // ISO-639-2/T language code
        } else {
            bit(7) reserved;
            utf8string extended_language
        }
        int(16) alternate_group;
        if (flags&16) {
            unsigned int(32) width;
            unsigned int(32) height;
            int(16) layer;
            if (flags&32)      int(32)[9]matrix ;
        }
        if (flags&64)      int(16)volume;
    }
}
```

```
aligned(8) class DynamicMovieBox extends FullBox('dymv', version=0, flags){
    if (flags & 1) {
        unsigned int(32) source_id;
        unsigned int(32) bundle_id;
        unsigned int(24) source_flags;
    } else {
        source_id=0;
        bundle_id=0;
        source_flags=0;
    }
    DynamicTrackBox   track;       // optional: zero or more
    UserDataBox       user_data;   // optional: zero or one
    MetaBox           meta;        // optional: zero or one
}
```

1200

1205

METHOD, DEVICE, AND COMPUTER PROGRAM FOR OPTIMIZING DYNAMIC ENCAPSULATION AND PARSING OF CONTENT DATA

CROSS REFERENCE TO RELATED APPLICATION

This application is the National Phase application of PCT Application No. PCT/EP2023/068231, filed on Jul. 3, 2023, which claims the benefit under 35 U.S.C. § 119 (a)-(d) of United Kingdom Patent Application No. 2210190.1, filed on Jul. 11, 2022 and entitled "Method, device, and computer program for optimizing dynamic encapsulation and parsing of content data" and United Kingdom Application No. 2215334.0, filed on Oct. 17, 2022 and entitled "Method, device, and computer program for optimizing dynamic encapsulation and parsing of content data". The above cited patent applications are incorporated herein by reference in their entirety.

FIELD OF THE INVENTION

The present invention relates to a method, a device, and a computer program for improving dynamic encapsulation and parsing of media data.

BACKGROUND OF THE INVENTION

The ISO base media file format (ISOBMFF, also called file format) is a general format forming the basis for a number of other more specific file formats. ISOBMFF is standardized by the International Standardization Organization as ISO/IEC 14496-12. This format contains characteristics of media data like timing, size, or media information for timed sequences of media data, such as audio-visual presentations. These characteristics are generally referred to as metadata (or structure-data), in opposition to media data (or data). An ISO Base media file (also referred to as media file or movie file or media presentation) may come as one file containing the whole presentation or as multiple segment files, each segment containing a temporal portion of the presentation. An ISO Base media file is structured into "boxes", each of which being identified by a four-character code, also denoted FourCC or 4CC. In the file format, the overall presentation is called a movie. A movie, or a presentation, is logically divided into tracks, or consists of one or more tracks, wherein each track represents a timed sequence of media (for example a timed sequence of video pictures, a picture being either a frame or a field for interlaced video). Within each track, each timed unit is called a sample. Each track has one or more sample descriptions. Each sample in the track is tied to a description by reference. All the structure-data or metadata, including that defining the placement and timing of the media, is contained in structured boxes. The media data (frames of video or samples of audio, for example) is referred to by this structure-data or metadata. Media data are stored in media data boxes (e.g. 'mdat', 'imda', etc.). A presentation may contain zero or more media data boxes. The overall duration of each track is defined in the structure-data. Each sample has a defined duration. The exact decoding timestamp of a sample is defined by summing the duration of the preceding samples.

FIG. 1 illustrates an example of encapsulated media data temporally organized as a fragmented presentation in one or more media files according to the ISO Base Media File Format.

Media data encapsulated in a media file 100 starts with a FileTypeBox ('ftyp') box (101) providing a set of brands identifying the precise specifications to which the encapsulated media data conform, that are used by a reader to determine whether it can process the encapsulated media data. The 'ftyp' box is followed by a MovieBox ('moov') box referenced 105. The MovieBox box provides initialization information that is needed for a reader to initiate processing of the encapsulated media data. In particular, it provides a description of the presentation content, the number of tracks, and information regarding their respective timelines and characteristics. For the sake of illustration, the MovieBox box may indicate that the presentation comprises one track having an identifier track_ID equal to 1.

A fragmented ISO Base Media File 100 may be a set of media segment files in which the MovieBox ('moov') box 105 does not contain the information for the full duration of the movie. In particular, it may have few or no samples in its tracks (tracks being described by 'trak' box 135). To this minimal or empty movie, extra samples are added, in structures called movie fragments (e.g. movie fragments 100-1 and 100-2), described by a hierarchy of boxes, mainly a pair of 'moof' box (e.g. 'moof' box 110 or 120) and 'mdat' box (e.g. 'mdat' box 115 or 125). Each movie fragment comprises metadata stored in a MovieFragmentBox ('moof') box (and its sub-boxes) and media data stored in a MediaDataBox ('mdat') box (or in an identified media data box 'imda'). Presence or absence of movie fragments in a media file is indicated early in the file by the MovieExtendsBox ('mvex') box 130. When present, information contained in this box warns readers that there might be subsequent movie fragments and that these movie fragments must be found and scanned in the given order to obtain all the samples of a track. To that end, information contained in this box should be combined with other information of the MovieBox box. MovieExtendsBox box 130 may contain an optional MovieExtendsHeaderBox ('mehd') box and one TrackExtendsBox ('trex') box per track defined in Movie-Box 'moov' box 105. When present, the MovieExtendsHeaderBox box provides the overall duration of a fragmented movie. Each TrackExtendsBox box defines default parameter values for the description of the samples (type, size, duration, control flags, etc.) of the track fragment.

For the sake of illustration, media file 100 comprises a first movie fragment 100-1 containing and describing samples 1 to N of a track identified with track_ID equal to 1 (as indicated in the 'tfhd' box). This first movie fragment 100-1 is composed of 'moof' box 110 and of 'mdat' box 115. Still for the sake of illustration, media file 100 comprises a second movie fragment 100-2 containing and describing samples N+1 to N+M of the track identified with track_ID equal to 1. Like the first movie fragment, second movie fragment 100-2 is composed of a 'moof' box (referenced 120) and of a 'mdat' box (referenced 125).

Encapsulated media data may be fragmented in a single media file or into a plurality of media segment files (referred to as segment files). When encapsulated into a plurality of segment files, the FileTypeBox and MovieBox boxes (also denoted initialization fragments in the following) are contained within an initial segment file (also denoted an initialization segment), in which the one or more tracks do not contain any sample. Subsequent segment files contain one or more movie fragments like movie fragment 100-1 and movie fragment 100-2. These one or more movie fragments may constitute an ISOBMFF segment, a DASH segment, DASH media segment, CMAF segment, or a CMAF fragment.

The use of movie fragments is particularly relevant for live encoding and live packaging (or encapsulating), because this encapsulation mode requires less buffering capacities for encapsulation modules. This is also relevant for low-latency streaming, for example for adaptive streaming over HTTP like DASH or HLS (HTTP Live Streaming), because encoded media can be available as soon as a movie fragment is encoded and encapsulated.

Movie fragments such as movie fragments 100-1 and 100-2 have a box hierarchy that differs from the box hierarchy under a 'moov' box. Likewise, track fragments (described in TrackFragmentBox ('traf') box, for example 'traf' boxes 111 and 121) have a box hierarchy that differs from the TrackBox box (for example from 'trak' box 135). As illustrated, TrackBox box 135 contains in its box hierarchy a SampleTableBox ('stbl') box that in turn contains descriptive and timing information of the media samples of the track. It is noted that in the case according to which media file 100 is fragmented, it may have no sample described in the boxes under the SampleTableBox ('stbl') box, like the boxes providing sample size or timing information. However, the SampleTableBox ('stbl') box contains a SampleDescriptionBox ('stsd') box containing one or more SampleEntry boxes giving descriptive information about the coding format of the samples (the coding format being identified with a specific 4CC, as illustrated with 'xxxx' characters), and initialization information needed for configuring a decoder according to the coding format.

For the sake of illustration, a SampleEntry box having a four-character type set to 'vvc1' or 'vvi1' signals that the associated samples contain media data encoded according to the Versatile Video Coding (VVC) format and a SampleEntry box having a four-character type set to 'hvc1' or 'hev1' signals that the associated samples contain media data encoded according to the High Efficiency Video Coding (HEVC) format. As another examples, a sample entry 'gpe1' or 'gpeg' indicates volumetric media data encoded with G-PCC (ISO/IEC 23090-9). The SampleEntry box may contain other boxes containing information that applies to all samples associated with this SampleEntry box. Samples are associated with a SampleEntry box via the sample_description_index parameter either in a SampleToChunkBox ('stsc') box in the SampleTableBox ('stbl') box in the case according to which the media file is a non-fragmented media file, or otherwise in a TrackFragmentHeaderBox ('tfhd') box in a TrackFragmentBox ('traf') box of the MovieFragmentBox ('moof') box or in a TrackExtendsBox ('trex') box in a MovieExtendsBox ('mvex') box when the media file is fragmented. According to ISO Base Media File Format, all tracks and all sample entries in a presentation are defined in a 'moov' box, for example 'moov' box 105, and cannot be declared later on during the presentation.

In movie fragments, the samples are mainly described within a TrackFragmentHeaderBox ('tfhd') box possibly providing default sample entry (type of codec in use and coding configuration information), default sample size, and/or default sample duration. The actual sample size, duration, offsets in the media data part, or flags (in the case according to which these values are different from the default values or in the case according to which no value is defined by default) may be indicated in a TrackRunBox ('trun') box for sample description. A TrackRunBox ('trun') box documents a contiguous set (a run) of samples for a track in the movie fragment.

For example, regarding sample timing, a track fragment may contain a TrackFragmentBaseMediaDecodeTimeBox ('tfdt') box providing the absolute decoding timestamps (using a baseMediaDecodeTime parameter), measured on the decoding timeline, of the first sample in decoding order in the track fragment. For random access or synchronization, a track fragment may have an indication of a decoding time in the 'tfdt' box. When this box is present, it is not necessary for a player or a reader to sum the sample durations of all preceding samples in previous fragments to find this value. For example, the MPEG DASH specification mandates this box to be present in each 'traf' box of a media segment in live profile for ISOBMFF. A 'moof' box may contain one or more 'traf' boxes, for example multiplexing audio and video track fragments in a same media data box. Some specification based on ISOBMFF may constrain a media file or segment files to contain one 'traf' box per 'moof' box.

It is also noted that ISOBMFF and its extensions comprise several grouping mechanisms to group together tracks, static items, or samples and to associate a group description with a group. A group typically shares common semantic and/or characteristics. For example, MovieBox ('moov') box 105 and/or MovieFragmentBox ('moof') boxes 110 and 120 may contain sample groups associating properties to groups of samples for a track or for a track fragment. The sample groups characterized by a grouping type may be defined by two linked boxes, a SampleToGroupBox ('sbgp') box that represents the assignment of samples to sample groups and a SampleGroupDescriptionBox ('sgpd') box that contains a sample group entry for each sample group describing the properties of the group.

The Common Media Application Format (CMAF) is standardized as ISO/IEC 23000-19. It is built on top of ISOBMFF, especially on ISOBMFF segments, as a generic container for streaming delivery of multimedia presentations. For example, a same CMAF presentation may be described by different manifests like the MPD of MPEG DASH or the playlists in HTTP Live Streaming.

CMAF is codec agnostic and defines several profiles for audio, video, subtitles, etc. depending on the codec in use and on the type of application. For example, CMAF provides guidelines on the settings for CMAF fragments when a target application is low latency streaming. This is often a trade-off between encoding delay and buffering constraints and bitrate efficiency: the longer a CMAF Fragment, the bigger should be the reception buffer and probably the latency, but the more efficient may be the compression (avoiding encoding of intra-coded frames like IDR, CRA frames in MPEG video codecs, i.e. frames without coding dependencies to preceding encoded frames).

FIG. 2 illustrates a CMAF segment, addressable from a streaming manifest, and its relation with ISOBMFF movie fragments. A CMAF segment such as CMAF segment 200 typically has a duration of few seconds (e.g. 2 to 10 seconds) and may contain one or more consecutive CMAF fragments of a same track. A CMAF fragment corresponds to encoded ISOBMFF media segments with some specific constraints.

In the example illustrated in FIG. 2a, CMAF segment 200 contains a single CMAF fragment referenced 205 made up of 'moof' box 210 and 'mdat' box 215. For the sake of illustration, 'mdat' box 215 comprises video samples like 220-1, 220-6, and 220-10. Still according to the illustrated example, the first sample (i.e. sample 220-1) corresponds to a random-access point, or stream access point, or stream switching point in the video stream. This access point can be used to start the presentation from a given time, to seek in the presentation, to change resolution or bitrate, to switch for streaming adaptation, etc. It is observed that while the samples illustrated in FIG. 2 correspond to video samples, the same organization may also apply to other types of media streams (e.g. audio, subtitles, etc.).

As illustrated in FIG. 2*b*, a CMAF fragment may contain several CMAF chunks. According to the illustrated example, CMAF fragment 205' comprises three CMAF chunks referenced 250-1 to 250-3. Still according to this example, each of the CMAF chunks comprises a set of contiguous samples, covering a given period of time that may vary from one chunk to another. As illustrated, each CMAF chunk is actually built like a movie fragment and comprises a 'moof' box and a 'mdat' box. For example, CMAF chunk 250-1 comprises 'moof' box 255-1 and a 'mdat' box 260-1.

The first CMAF chunk of a CMAF Fragment (e.g. CMAF chunk 250-1) may be constrained to be addressable (e.g. associated to a URL or to a URL template) or to start with an adaptive switching point. This reduces the streaming latency because instead of waiting for a whole CMAF segment (like segment 200 in FIG. 2*a*) to be encoded, packaged (or encapsulated), and transmitted, a client has to wait for a single CMAF chunk to be encoded, packaged and transmitted. In other words, a client should only wait for a CMAF chunk to be available to request it, without waiting anymore for a whole segment to be ready.

The CMAF chunks follow the ISOBMFF rules on movie fragments with additional constraints like, for example, one 'traf' box per movie fragment with only one 'trun' box, a mandatory 'tfdt' per track fragment, and, depending on the use cases, additional boxes (e.g. SampleAuxiliaryInformationOffsetsBox 'saio' or SampleAuxiliaryInformationSizesBox ('saiz') box or 'seig' sample group description (CencSampleEncryption group)) describing the encryption.

While the ISOBMFF file format has proven to be efficient, there is a need to improve encapsulation efficiency in particular there is an increasing need for flexibility in the file formats (e.g. ISOBMFF or CMAF) to cope with the proliferation of live adaptive streaming or on-demand video streaming services. Indeed, content data are no more considered as a one piece of data with a complete configuration that is known in advance, but as dynamic content data wherein content may be injected, or spliced, at some time, for example to add adverts during a movie or a sports event playout. Likewise, additional media data may be overlaid on video, for example to provide scores or statistics onto a sport game video. This requires dynamic processes that have not been contemplated with file format. For example, all the tracks and all the sample descriptions have to be known and declared in advance, in ISOBMFF and derived specifications, despite fragmentation.

SUMMARY OF THE INVENTION

The present invention has been devised to address one or more of the foregoing concerns.

According to a first aspect of the invention, there is provided a method for encapsulating media data of a plurality of presentations in at least one media file based on ISOBMFF, the method comprising:

obtaining a portion of media data of a first presentation, denoted the first portion, the first presentation consisting of a first set of tracks, encapsulating first metadata describing tracks of the first set of tracks and encapsulating the first portion of the media data of the first presentation into one or more first media fragments, obtaining a portion of media data of a second presentation, denoted the second portion, the second presentation consisting of a second set of tracks, and encapsulating second metadata describing tracks of the second set of tracks into one or more second media fragments following the first media fragments and encapsulating the second portion of the media data of the second presentation into the one or more second media fragments, wherein the second metadata include an indication to signal that the second set of tracks does not comprise at least one track as described in the encapsulated first metadata.

Accordingly, the method of the invention provides dynamicity and/or flexibility to encapsulation and parsing while preserving key features of the file format like fragmentation and random access for example. The flexibility may consist in adding or removing tracks, in disabling tracks declared at the beginning, in overwriting tracks, in replacing tracks, in inserting tracks, etc. The indication of changes in the track configuration preserves random access, meaning that any player tuning into the media presentation is able to get the current track configuration without additional request to minimize start-up delay.

According to some embodiments, the second metadata include an indication to signal that a value of a least at one parameter of the description of at least one track belonging to the first and the second sets of tracks is different in the first metadata and in the second metadata.

According to some embodiments, the second set of tracks does not comprise at least one track described in the first metadata.

According to some embodiments, the second set of tracks comprises at least one track that is not described in the first metadata.

According to some embodiments, the at least one media file comprises a metadata part for encapsulating metadata common to all media data encapsulated in the at least one media file, the first metadata being encapsulated in the metadata part.

According to some embodiments, at least one of the one or more first media fragments comprise a metadata part for encapsulating metadata common to all media data encapsulated in the at least one of the one or more first media fragments, the first metadata being encapsulated in the metadata part of the at least one of the one or more first media fragments.

According to some embodiments, the indication to signal that the second set of tracks does not comprise at least one track as described in the encapsulated first metadata comprises an indicator to indicate that the second set of tracks is a new set of tracks.

According to some embodiments, the indication to signal that the second set of tracks does not comprise at least one track as described in the encapsulated first metadata comprises an indicator to indicate that the second set of tracks has already been described and that at least one parameter of the description of the second set of tracks has changed.

According to some embodiments, the second metadata further includes an indication to signal that the one or more second media fragments can be parsed independently from the first fragment.

According to some embodiments, the fragments are Common Media Application Format, CMAF, segments or fragments or ISO Base Media File Format, ISOBMFF, segments or fragments.

According to a second aspect of the invention, there is provided a method for parsing media data of a plurality of presentations, the media data being encapsulated based on ISOBMFF as a plurality of fragments of one or more media files, the method being carried out by a client and comprising:

obtaining first metadata describing tracks of a first set of tracks of a first presentation, obtaining at least one media fragment comprising encapsulated second metadata and encapsulated media data, the second metadata describing tracks of a second set of tracks of a second presentation, the encapsulated media data being media data of the second presentation and the at least one media fragment following a media fragment comprising media data of the first presentation, parsing at least a part of the second metadata, and upon determining that the second metadata include an indication to signal that the second set of tracks does not comprise at least one track as described in the encapsulated first metadata, updating a track description to be used for parsing the encapsulated media data.

Accordingly, the method of the invention provides dynamicity and/or flexibility to encapsulation and parsing while preserving key features of the file format like fragmentation and random access for example. The flexibility may consist in adding or removing tracks, in disabling tracks declared at the beginning, in overwriting tracks, in replacing tracks, in inserting tracks, etc. The indication of changes in the track configuration preserves random access, meaning that any player tuning into the media presentation is able to get the current track configuration without additional request to minimize start-up delay.

According to some embodiments, updating the track description comprises parsing at least another part of the second metadata, updating the track description being based on metadata of the at least another part of the second metadata.

According to some embodiments, the at least another part of the second metadata comprises a description of at least one track not described in the first metadata.

According to some embodiments, the at least another part of the second metadata comprises a new value of at least one parameter of a description of at least one track described in the first metadata.

According to some embodiments, the one or more media files comprise a metadata part for encapsulating metadata common to all media data encapsulated in the one or more media files, the first metadata being encapsulated in the metadata part.

According to some embodiments, the first metadata are obtained from a media fragment.

According to some embodiments, the method further comprises:

obtaining at least one media fragment comprising encapsulated third metadata and encapsulated media data, the third metadata describing tracks of a third set of tracks of a presentation comprising the media data encapsulated in the at least one media fragment comprising the third metadata, parsing at least a part of the third metadata, and upon determining that the third metadata include an indication to signal that the description of the third set of tracks is similar to a description of a set of tracks determined previously, skipping parsing of another part of the third metadata and using a current description of a set of tracks for parsing media data of the at least one media fragment comprising the encapsulated third metadata.

According to other aspects of the invention, there is provided a processing device comprising a processing unit configured for carrying out each step of the methods described above. The other aspects of the present disclosure have optional features and advantages similar to the first and second above-mentioned aspects.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 6a and 6b illustrate an example of box-based information to indicate dynamic track configuration in a media file;

DETAILED DESCRIPTION OF THE INVENTION

According to some embodiments of the invention, the content of some 'moof' boxes of fragmented ISOBMFF media data is optimized to provide dynamicity and/or flexibility to encapsulation and parsing while preserving key features of the file format like fragmentation and random access for example.

According to some embodiments of the invention, a track structure or a track configuration may be declared along a media presentation, and not only at the beginning of the presentation. Moreover, the track configuration is repeated to guarantee random access for readers, the repetition being done in a way to avoid useless processing for readers continuously playing the file. Therefore, some embodiments of the invention extend the movie fragments and facilitate fragment or segment concatenations with minimal ISOBMFF structure rewriting. New ISOBMFF structures are defined to make this feature interoperable between writers and parsers supporting this feature.

General Encapsulation and Parsing Process

Figure 1:
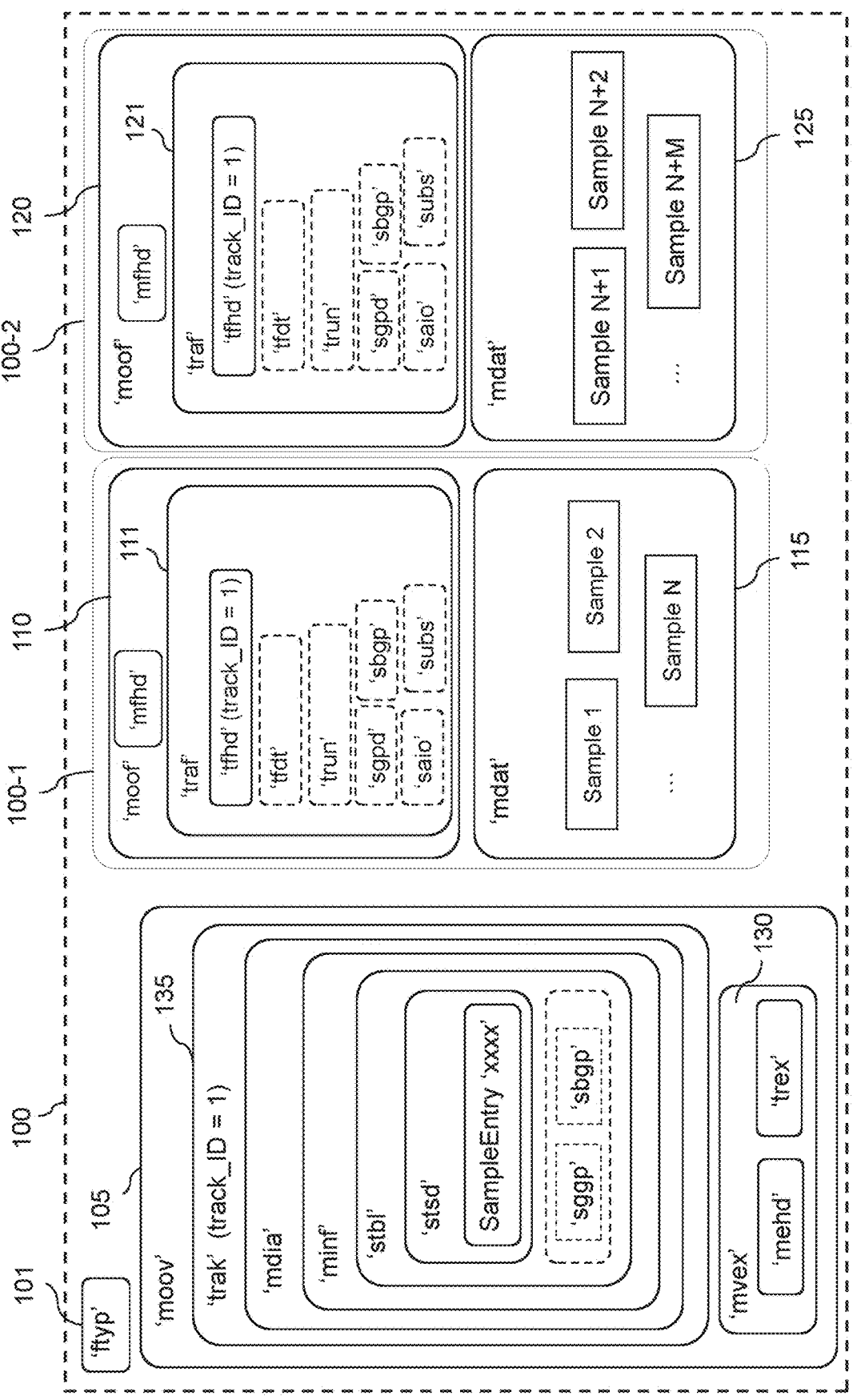
FIG. 1 illustrates an example of encapsulated media data temporally organized as a fragmented presentation in one or more media files according to the ISO Base Media File Format.
Figure 2:
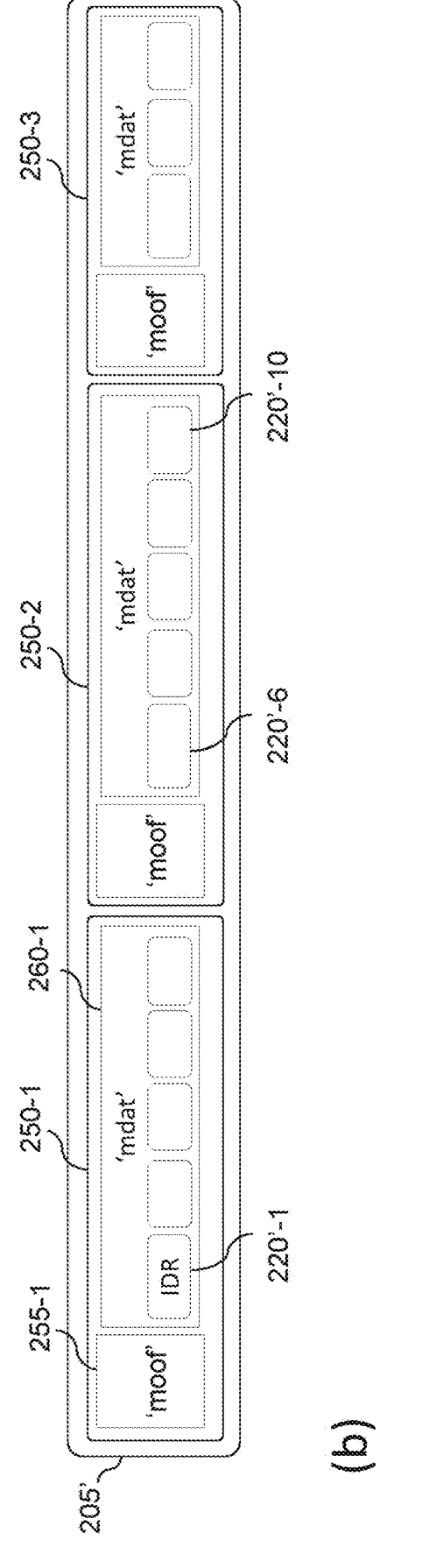
FIG. 2 illustrates a CMAF segment, addressable from a streaming manifest, and its relation with ISOBMFF movie fragments.
Figure 3A:
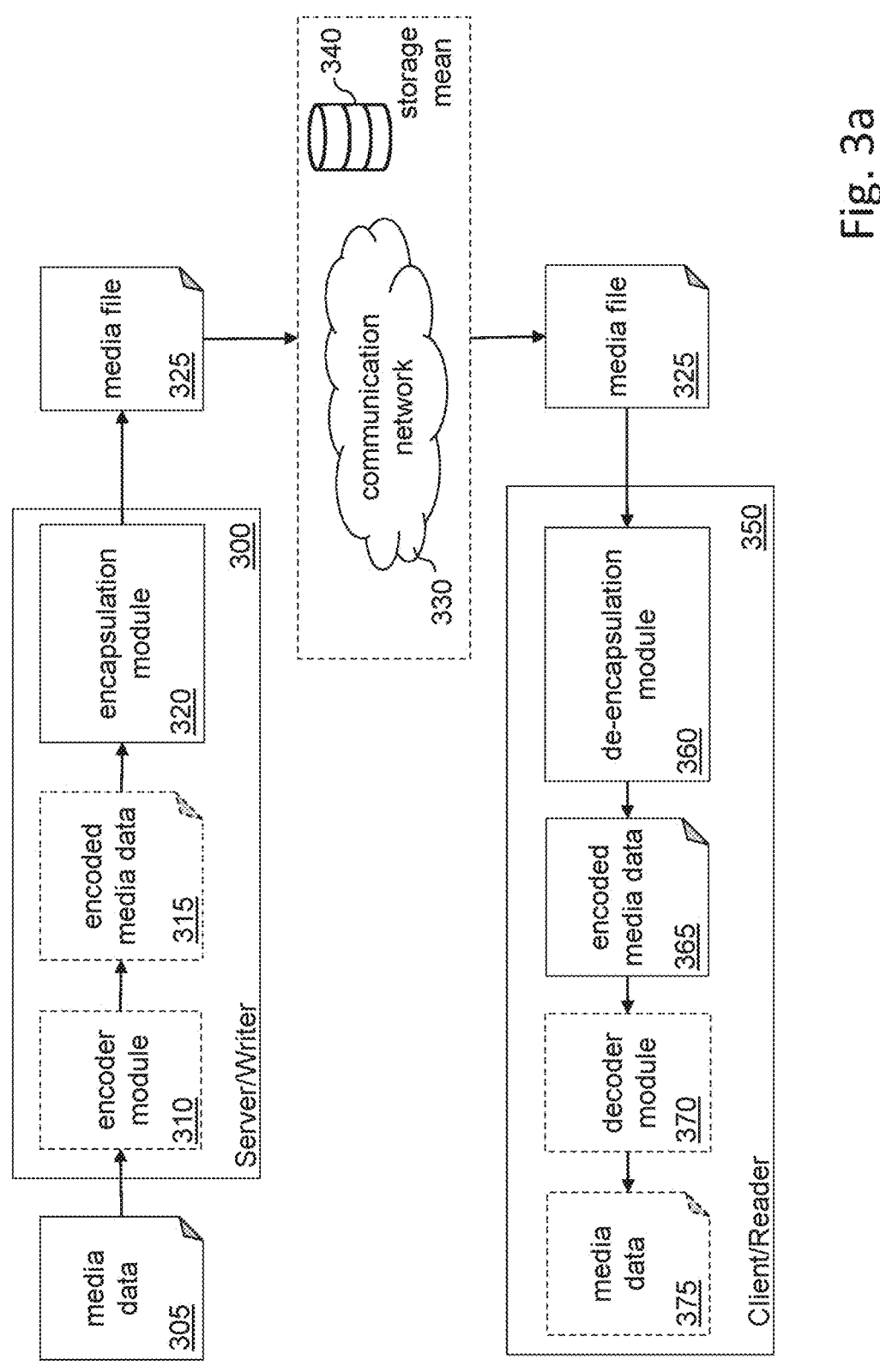
FIGS. 3a, 3b, and 3c illustrate an overview of methods for encapsulating or storing multimedia presentations according to some embodiments of the invention.

FIG. 3a illustrates an overview of a first method for encapsulating or storing multimedia presentations according to some embodiments of the invention. The media data to be encapsulated or stored, referenced 305, can be video, spatial sub-part of a video, audio, volumetric visual media, subtitles, or a combination of such elementary streams. They are encapsulated into a media file or into media segment files 325 in a way that allows adaptive streaming over HTTP, possibly with low latency. As illustrated, a server 300 comprises an encapsulation module 320 (also called ISOBMFF writer or simply writer) and optionally a streaming manifest generation module (not represented). The server 300 may be connected, via a network interface (not represented), to a communication network 330 to which is also connected, via a network interface (not represented), a client 350. An example of client is a media player on a PC, tablet, TV or smartphone.

Server 300 processes media data 305 to prepare it for streaming or for storage, this is called encapsulation. It mainly consists in adding metadata describing the media data in terms of kinds of data, codec in use, size, data offsets, timing, etc. As mentioned above, media data 305 may correspond to audio presentation or video presentation or both, possibly with subtitles or timed text. Media data 305 may be the raw data captured by sensors or generated by a content creator or editing tools. Media data 305 may be available as compressed or encoded media data 315, possibly according to different encoded versions. This means that the encoding or compression may be performed by the server itself with an encoder module like encoder module 310 (possibly one per media type) or remotely from the server. The compression may be live encoding (as well as the encapsulation).

Media data 305 may also be encapsulated media data, these media data being encapsulated in a way that is not suitable for low-latency streaming, for example as non-fragmented tracks. In the latter case, the encapsulation module (e.g encapsulation module 320) also contains a reader part to de-encapsulate the media data and then encapsulate de-encapsulated media data, according to some embodiments of the invention.

According to the illustrated example, encapsulation module 320 of server 300 is used to encapsulate the media data into movie fragments, for example according to ISOBMFF and its extensions (e.g. CMAF, NAL-unit based File Format, etc.). Server 300 then generates a media file referenced 325 or one or more segment files 325. The server 300 may optionally generate a streaming manifest like a DASH MPD or HLS playlist (not represented). The generated file, segment files, or manifest may be stored in a remote storage device, for example in a remote storage device accessible through network 340, for redistribution via on-demand or live streaming.

According to some embodiments of the invention, encapsulation module 320 generates an encapsulation file (or segments) allowing low-latency and adaptive streaming over HTTP.

Client 350 is used for processing data received from communication network 330, or read from a (local or remote) storage device, for example for processing media file or media segments 325. The data may be streamed to the client, thus involving a streaming module (not represented) in charge of parsing a streaming manifest, of determining requests to fetch the media streams, and of adapting the transmission, according to indication in the manifest and client parameters like for example available bandwidth, CPU, application needs, or user preference.

The received data is de-encapsulated in de-encapsulation module 360 (also known as a ISOBMFF parser, ISOBMFF reader, or simply parser or reader), the de-encapsulated data (or parsed data) may be decoded by a decoding module for storage display or for output to an application or to user(s). The decoder module (possibly one or more per media type) may be part of the client, may be an external module, or may be a dedicated hardware. The de-encapsulated data may correspond to encoded media data 365 (e.g. video bitstream, audio bitstream, etc.).

The de-encapsulation, decoding, and rendering may be live operations processing the media file as soon as it is received, for example by processing data chunks for each media stream in parallel and in synchronization to minimize the latency between the recorded multimedia presentation (as media data 305) and its visualization by user(s) as media data 375 for example onto his/her device's screen.

Client or server may be user devices but may also be network nodes acting on the media files being transmitted or stored. Server or client may only contain, respectively, the encapsulation and de-encapsulation parts.

It is noted that media file 325 may be communicated to client or reader 350 in different ways. In particular, server or writer (or packager) 300 may generate media file 325 with a media description (e.g. a DASH MPD) and communicate (or stream) it directly to client 350 upon receiving a request from client 350. Media file 325 may also be downloaded, at once or progressively, by and stored in client 350.

For the sake of illustration, media file 325 may encapsulate media data into boxes according to the ISO Base Media File Format (ISOBMFF, ISO/IEC 14496-12) and its derived specifications (e.g. Carriage of NAL unit structured video in the ISOBMFF, ISO/IEC 14496-15 or Common Media Application Format, CMAF ISO/IEC 23001-19). In such a case, media file 325 may correspond to one or more media files (indicated in a FileTypeBox ('ftyp') box or in a Seg-mentTypeBox ('styp') box). According to ISOBMFF, media file 325 may include two kinds of boxes, one or more "media data boxes" (e.g. 'mdat' or 'imda' boxes), containing the media data, and "metadata boxes" (e.g. 'moov' or 'moof' boxes) containing metadata defining placement and timing of the media data. The media file or segment files contain movie fragments. The media data box(es) contain all the data of media data 305 or encoded media data 315. There may be one media data box multiplexing media data but there may also be one or more media data boxes, for example one per media type and possibly one or more per movie fragment.

Figures 3B, 3C:
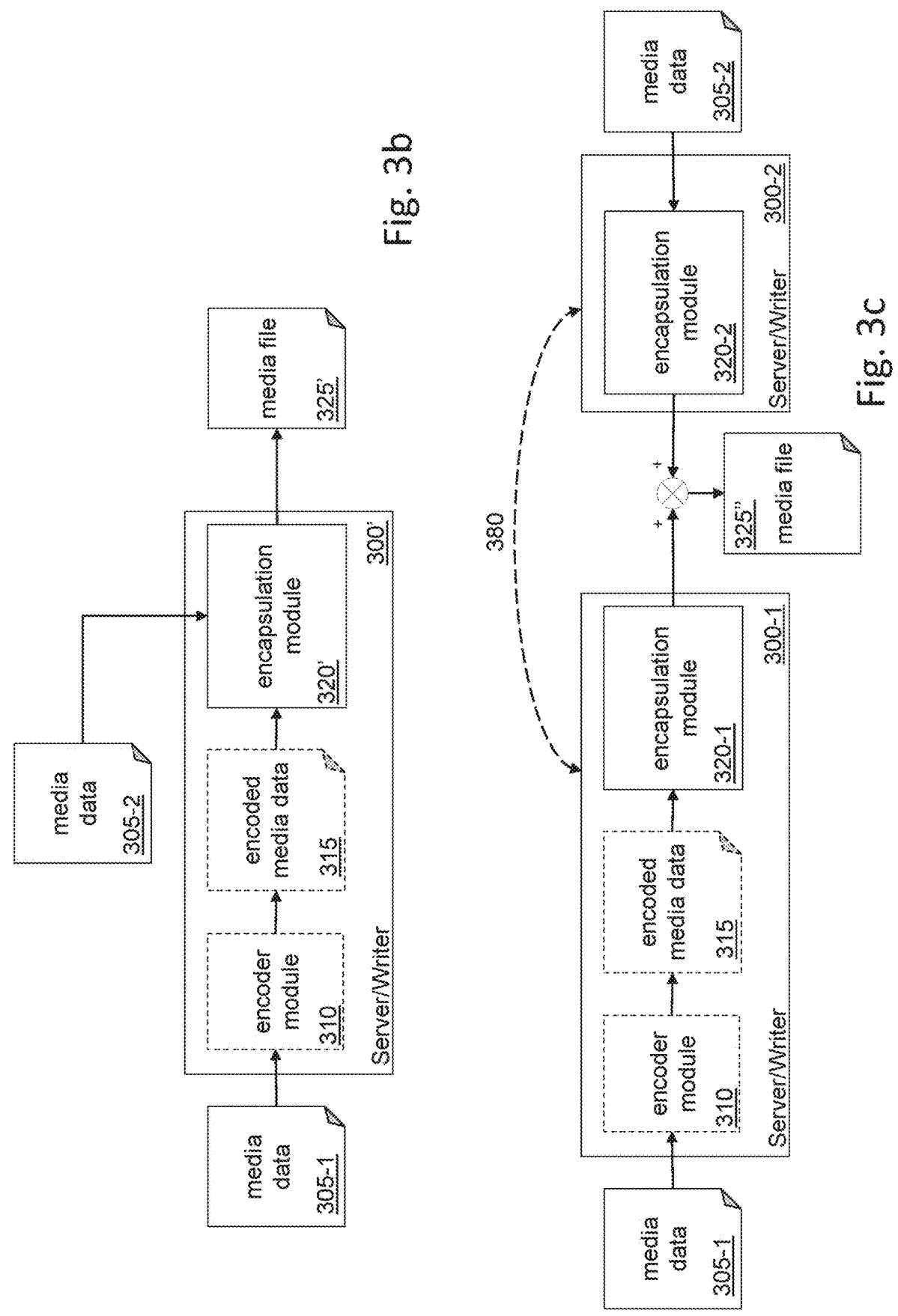

There may be variants in the system configuration, especially on the encapsulation side as depicted in FIG. 3b or FIG. 3c.

FIG. 3b illustrates an overview of a second method for encapsulating or storing multimedia presentations according to some embodiments of the invention.

For the sake of illustration, media file 305-1 is similar to media file 305 in FIG. 3a and optional encoder module 310 and encoded media file 315 are similar to optional encoder module 310 and encoded media file 315 described by reference to FIG. 3a.

As illustrated, compared with encapsulation module 320 described in FIG. 3a, encapsulation module 320' may encapsulate media data from several sources, for example media data 305-1 and media data 305-2, within media file 325', for example by adding data from media data 305-2 into media data 305-1, by overwriting data of media data 305-1 with data from media data 305-2, or replacing data from media data 305-1 with data from media data 305-2. Media data 305-2 may be for example an advert to insert in the middle of a movie, the movie being media data 305-1.

FIG. 3c illustrates an overview of a third method for encapsulating or storing multimedia presentations according to some embodiments of the invention, wherein several encapsulation modules are used to encapsulate different media data in media file 325".

Still for the sake of illustration, media files 305-1 and 305-2 may be similar to media files 305-1 and 305-2 in FIG. 3b and optional encoder module 310 and encoded media file 315 may be similar to optional encoder module 310 and encoded media file 315 described by reference to FIG. 3a. Likewise, writer 300-1 and encapsulation module 320-1 may be similar to writer 300 and encapsulation module 320 in FIG. 3a. According to the example illustrated in FIG. 3c, a first writer is used to encapsulate a first media file, for example writer 300-1 is used to encapsulate media file 305-1 that may be a movie, and a second writer is used to encapsulate a second media file, for example writer 300-2 is used to encapsulate media file 305-2 that may be an advert. The encapsulated media files may be combined within media file 325". Writers 300-1 and 300-2 may be distinct entities, working independently from each other and possibly without any knowledge from each other. It is noted that writer 300-2 may also contain an encoder module (not depicted). Still for the sake of illustration, media file 325" may consist in a concatenation of a media file generated by writer 300-1 on the one hand and of a media file generated by writer 300-2 on the other hand.

Encapsulation module 320-1 in writer 300-1 may be in charge of encapsulating a main presentation and the second encapsulation module 320-2 in writer 300-2 may be in charge of encapsulating additional, replacement, splicing, or alternative content. In such a case, the operation performed by the second writer may be referred to as "blind" splicing or "late splicing".

According to some embodiments, the two writers may share common setup information, for example the knowledge of information that is written in the 'moov' box, like the initial track or sample configurations, as suggested with reference 380. This allows implementing more advanced use cases than blind-splicing. For example, this allows to invalidate some tracks, to overload some tracks, to keep some tracks active, etc. Such a configuration may be denoted "non-blind splicing" or "early splicing".

Encapsulation of Media Files According to Some Embodiments of the Invention

Figure 4:
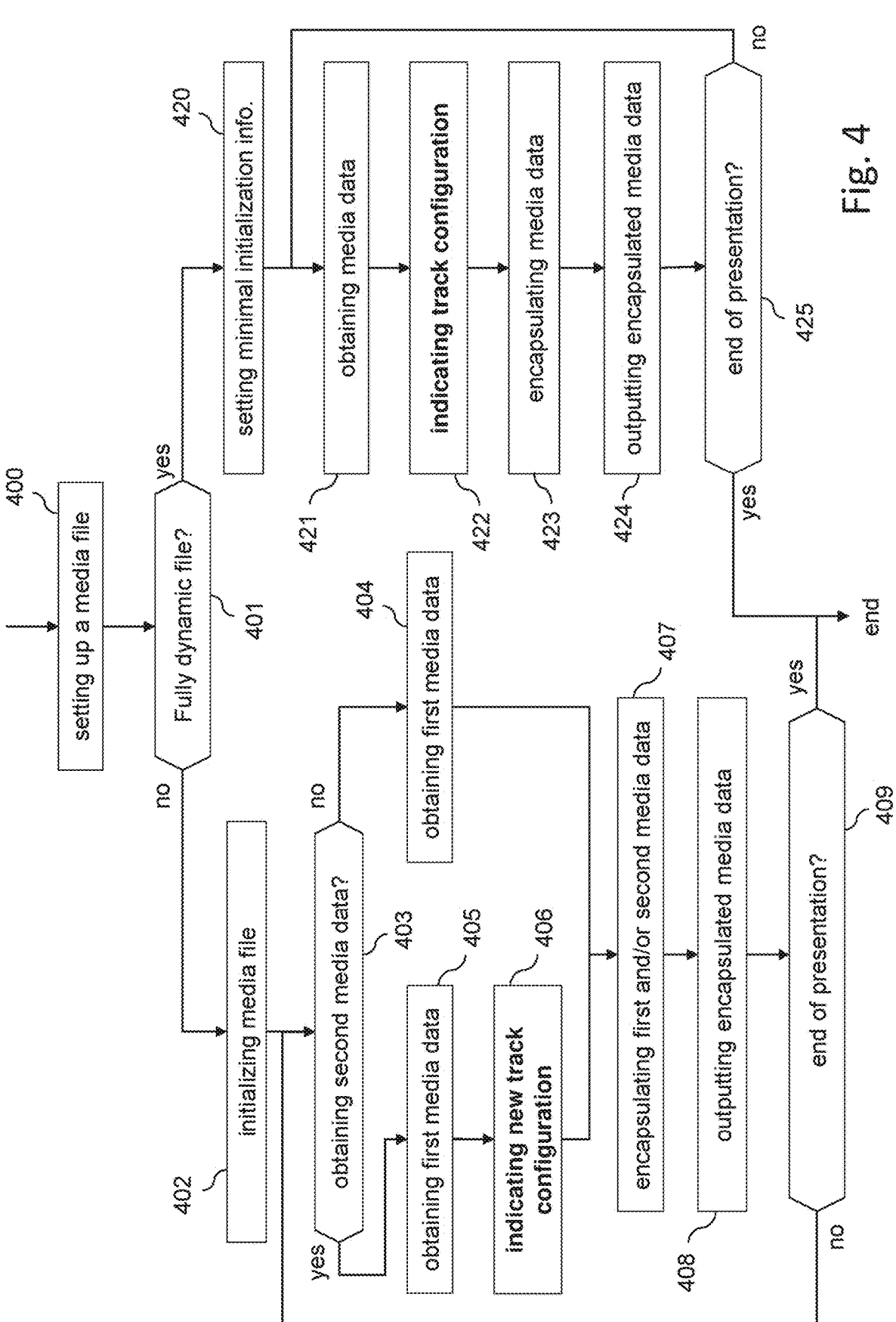
FIG. 4 illustrates an example of steps of an encapsulation process according to some embodiments of the invention.

FIG. 4 illustrates an example of steps of an encapsulation process according to some embodiments of the invention. For the sake of illustration, such steps may be carried out in encapsulation module 320 in FIG. 3a, in encapsulation module 320' in FIG. 3b, or in encapsulation module 320-1 or 320-2 in FIG. 3c.

As illustrated, a first step is directed to initializing the writer (step 400), for example writer 300 in FIG. 3a, writer 300' in FIG. 3b, or writers 300-1 and/or 300-2 in FIG. 3c. Configuration may concern encapsulation module 320 in FIG. 3a, encapsulation module 320' in FIG. 3b, or encapsulation module 320-1 or 320-2 in FIG. 3c and encoder module 310 or encapsulation module(s) only if encoder settings cannot be controlled, for example in the case where the configuration is hard-coded. For the sake of illustration, the configuration step may comprise indicating whether the media file to generate consist in a single file or in multiple segment files. The configuration may comprise defining the granularity of random access in the presentation (for example, every second, every 2 seconds, etc.) and possibly, for streaming application, the switching points and addressable objects in the presentation (for example a DASH media segment, a CMAF segment, CMAF fragment or CMAF chunk). The configuration may also comprise indicating whether the media file to generate is fully dynamic or not.

A fully dynamic media file differs from a known ISO Base Media File in the sense that it may not contain the same box hierarchy as defined in ISO/IEC 14496-12. For example, the sequence of objects in a presentation in a fully dynamic media file may not contain exactly one MovieBox as it is the case for traditional ISO Base Media Files. Usually, an ISO Base Media File contains a top-level 'moov' box which contains one or more 'trak' boxes, each declaring a track (media type, header information) and sample configurations (e.g. 'stsd' boxes in 'stbl'). A fully dynamic ISOBMFF may not contain a 'moov' box. This kind of media file, providing dynamic movie fragment or dynamic tracks, may be indicated using the brand 'dytk' in the ExtendedTypeBox or by using the brand 'isod' or higher in the FileTypeBox ('ftyp') or in the SegmentTypeBox ('styp'). The MovieBox 'moov' may not be mandatory in a Fully dynamic media file, for example using dynamic tracks. But, in that case, the first movie fragment loaded may have a File TypeBox or ExtendedTypeBox indicating support for dynamic tracks (e.g. using the above proposed brands or any brands value defined for indicating support for dynamic tracks). The FileTypeBox could even be made optional and could be replaced by a mandatory SegmentTypeBox instead. A fully dynamic media file may alternatively still contain a movie box, but it may contain no track declaration, just movie header information for example.

If the media file to generate is not a fully dynamic media file (test 401 is false), the writer generates initialization data according to ISOBMFF (step 402), including a 'ftyp' box and a 'moov' box at top-level of the file. The created 'moov' box contains 'trak' boxes, each declaring information for tracks that are known at the creation time of the media file. As for fully dynamic media files, the media file here may contain a specific brand indicating that it may contain or support dynamic tracks (i.e. tracks that may be declared later in the file, and not necessarily in a 'trak' box under the top-level 'moov' box). This initialization data may be used as initialization segment for example for an adaptive streaming usage. Next, after the initialization, the writer starts encapsulating data for the media presentation. For the sake of illustration, it is assumed that the encapsulation aims at encapsulating first media data (e.g. a movie) and second media data (e.g. an advertisement or temporary information to render on top or along of the movie). A main difference between the first and second media data is that first media data are assumed to be known at setup time. Accordingly, the 'moov' box may comprise a track declaration for the first media data and no track declaration for the second media.

As illustrated, the encapsulation step may comprise checking whether second media data are to be encapsulated (test 403) and, if no second media data are to be encapsulated, obtaining some first media data (step 404) and encapsulating the obtained first media data (step 407). The encapsulation may comprise describing samples and indexing the corresponding data that are stored in a media data box (e.g. 'mdat' or 'imda'). For example, the sample description (e.g., the size, data offset, duration, and/or composition time) for the first media data may be provided in a 'trun' box. The so-encapsulated media data are output as part of the media file (step 408) and the process iterates until the end of the media presentation (test 409). If the end of the presentation is not reached, the algorithm loops to step 403 to obtain second media data, if any. If second media data are to be encapsulated, they are obtained and the writer generates a new track configuration (step 406). The indication of track configuration is described here after in reference to FIGS. 6a and 6b. As illustrated, first media data may also be obtained (step 405) in parallel to obtaining second media data. After indicating the track configuration, the writer encapsulates first, second, or both first and second media data (step 407) and output the encapsulated media data as part of the media file (step 408). The output may be based on an ISOBMFF fragment basis, on a CMAF Fragment, on a CMAF segment basis, or on an ISOBMFF segment.

If the media file to generate is a fully dynamic media file (test 401 is false), the encapsulation module generates a minimal set of initialization information items (step 420), for example, either the 'ftyp' or 'styp' box only or the 'ftyp' or 'styp' with a minimal 'moov' box (for example with no track declaration in it). Next, the writer obtains the media data to be encapsulated (step 421), i.e. first and/or second media data, and generates track configuration information (step 422) for the obtained media data. This step of indicating a track configuration is described hereafter in reference to FIGS. 6a and 6b. Next, the obtained media data are encapsulated (step 423), comprising describing the samples of the different tracks, and the encapsulated media data are output as part of the media file, for storage, transmission, or any usage using the media file. If the end of the presentation is not reached (step 425), the algorithm loops at step 421. As described with reference to step 409, the output may be based on an ISOBMFF fragment basis, on a CMAF Fragment, on a CMAF segment basis, or on an ISOBMFF segment basis.

Parsing Encapsulated Media Files According to Some Embodiments of the Invention

Figure 5:
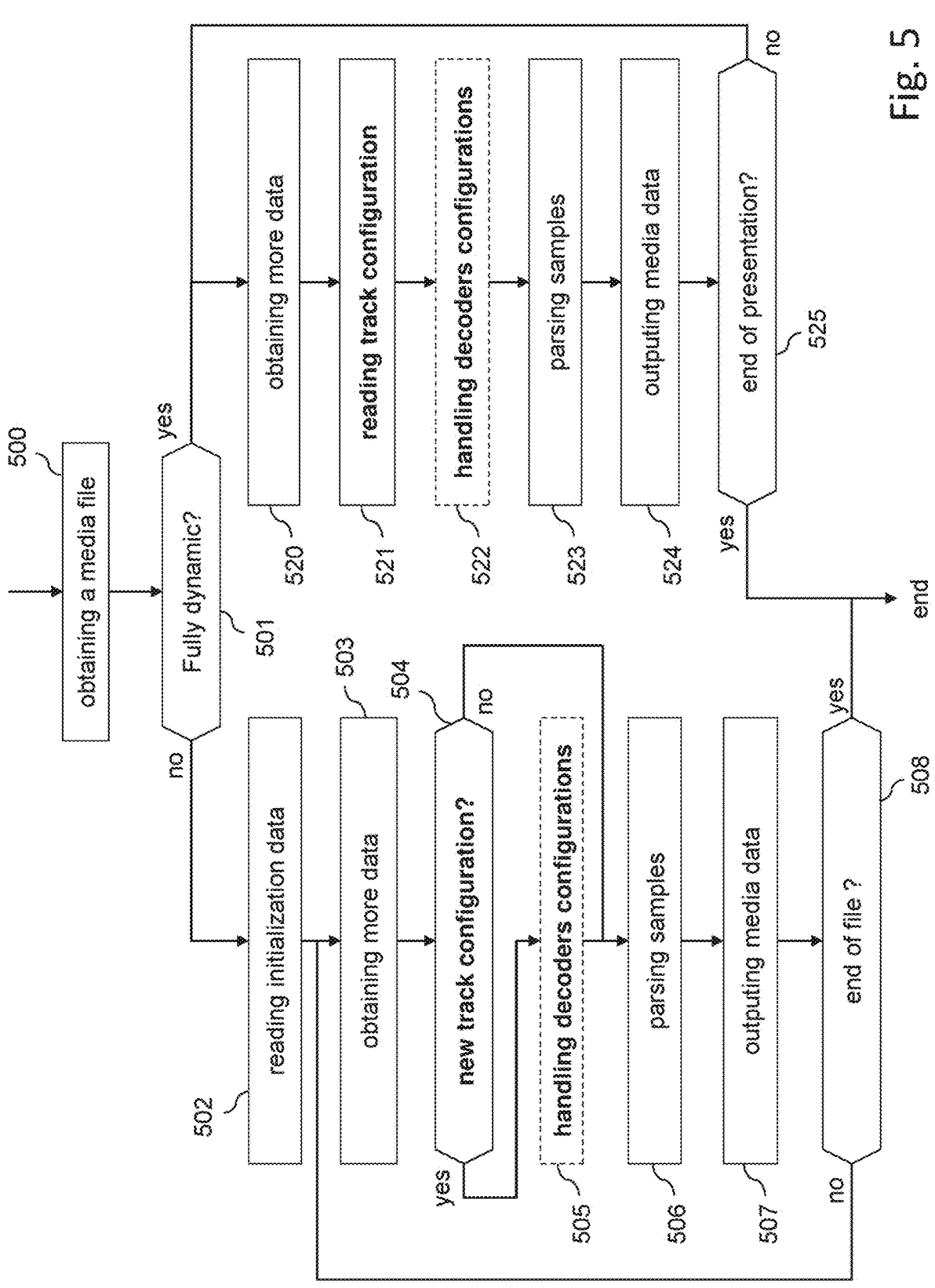
FIG. 5 illustrates an example of steps of a parsing process according to some embodiments of the invention.

FIG. 5 illustrates an example of steps of a parsing process according to some embodiments of the invention. It is noted that the client or reader that carries out such steps may also be called "parser", "application", "media player", or "player".

As illustrated, the process starts with initialization of the parser (step 500), based on a media file or media segment files received from a server or locally accessed, possibly with a manifest file, generated according to some embodiments of the invention, for example generated according to the steps illustrated in FIG. 4. More precisely, the player is initialized with information obtained by requesting an initialization segment or the beginning (e.g. first bytes) of a media file. The URL or byte range for initialization data may be obtained from a manifest file like DASH MPD or a playlist for HTTP Live Streaming. From the obtained initialization information, the player may determine the kind of media data present in the media presentation, whether the media file is fully dynamic or not, the codecs in use, etc.

Determining whether the media file is fully dynamic or not (step 501) may be based on a brand indication (e.g. 'dytk' brand or any dedicated brand value for indication of dynamic tracks in the media file) or by the presence or not of 'moov' box and presence of one or several 'trak' boxes. For example, if the player detects a 'ftyp' or a 'styp' box without any 'moov' box (or with a 'moov' without any track declaration in it), it may determine that the media file is a fully dynamic media file.

If the media file is not fully dynamic, the parser reads initialization data (step 502) and instantiate appropriate decoders to handle media data requested in subsequent steps. Reading these initialization data, the parser can determine that possibly changes of track configuration or modification of the presentation may occur (indication in a brand, for example with 'dytk' value with a 'moov' box providing a complete track description). Next, the parser obtains encapsulated media data (step 503), for example by reading or downloading the data or by using streaming or progressive transmission mechanisms. It is noted that data may be obtained at different granularities, for example, as a movie fragment, an ISOBMFF segment, a CMAF fragment, or a CMAF segment. Next, the parser checks whether a new track configuration is part of the obtained data (step 504). If no track configuration is present, the parser or reader de-encapsulates (or parses) samples from each track (step 506) and provides the obtained data to appropriate buffers, decoders, or renderers (step 507).

If a new track configuration is present in the obtained data (as determined at step 504), the parser decodes and interprets the new track configuration to determine the current number of tracks and their configuration. Examples of track configuration are described hereafter in reference to FIGS. 6a and 6b. There may be new tracks and/or tracks defined in the 'moov' box. Depending on the tracks, especially when new tracks are present (i.e., tracks not described in the 'moov' box), the parser further inspects whether it has already encountered these new tracks or not. If not, it may further inspect track description, for example to get sample description. The track configuration and sample description may impact the set of decoders initialized at step 502. Depending on the track configuration, the parser may need to reset some decoders or may deduce from track configuration that some previous configurations may be reused without any reset. This parsing process is repeated until reaching the end of the encapsulated media file (i.e., the algorithm loops on step 503 if the end of the encapsulated media file is not reached).

If the parser determines that the media file is fully dynamic (step 501), it may not be able to setup decoders immediately. It obtains more data (step 520), for example by reading, downloading, or using a streaming mechanism. Again, these data may be obtained at different granularities, for example as a movie fragment, an ISOBMFF segment, a CMAF fragment, or a CMAF segment. For fully dynamic tracks, the parser processes the track configuration (step 521), as explained hereafter by reference to FIGS. 6*a* and 6*b*. From the track configuration, the parser can determine a current number of tracks and their characteristics (step 522). It is noted that when met for the first time, a track configuration may lead to some decoder initialization. When already met by the parser, a track configuration may consist in reusing decoder configurations already allocated or setup (e.g., in a previous step 522). After handling the track configuration, the parser or reader parses the samples (step 523) to obtain corresponding data and outputs this data to a buffer, decoder, or renderer (step 524), depending on the application using the media file. As illustrated, the process iterates until the end of the presentation is reached (i.e., the algorithm loops on step 520 if the end of the presentation is not reached).

Dynamic Track Indication

FIGS. 6*a* and 6*b* illustrate an example of box-based information to indicate dynamic track configuration in a media file. This is directed to two aspects. The first one aims at defining a metadata structure fitting in ISOBMFF boxes to indicate a track configuration change (step 406) or a new track configuration (step 422). This signalling should also allow random access: whenever a player or reader starts parsing (or tunes into) a media presentation, it should be able to get the current track configuration. This means that indication of the track configuration should be repeated. The second aspect aims at providing an indication as to whether the track configuration changes or not (i.e., it is simply repeated). The second aspect may also provide an indication of the extent of the track configuration change like "minor" change, also called functionally equivalent, or "important" change that may require parser or reader to handle reset or update decoder configurations.

To handle the changes, an option could have been to rely on versions of the box: a same version number would indicate a repetition but this enters in conflict with box versioning and some boxes do not even have a version field, like UserDataBox. Moreover, it is not the intended purpose of box version, that is rather to indicate variation in the binary syntax and not in the payload. One approach to deal with this second aspect could be to perform a comparison of past and current boxes, typically through a hashing function. While this allows detecting identical configurations, it has several drawbacks since it is costly in terms of client resources (additional processing and memory requirements) and it does not allow to signal a repeated configuration with slight variations (in the meta-data for example) that do not require reparsing the data. Therefore, there is a need to introduce change detection mechanisms to indicate track configuration change (for example dynamic tracks or sample description changes) in movie fragments so that parsers or readers may properly identify repeated information across fragments.

At last, while samples may be signaled as repeated samples using dependency flags, ISOBMFF lacks support for such signaling for non-sample data (metadata or box structure). There exist mechanisms that allow sending configuration information for a media presentation. For example, the DSM-CC (ISO/IEC 13818-6) standard specifies a data carousel and an object carousel. The object carousel extends the more limited data carousel and specifies a standard format for representing a file system directory structure comprising a root directory or service gateway and one or more files and directories, but this feature is not available in ISOBMFF. According to the illustrated embodiment a DynamicMovieBox, referenced 600, that may be contained in a movie fragment ('moof' box, not represented), containing zero or more DynamicTrackBox, referenced 601, each containing a specific DynamicTrackHeaderBox, referenced 602, and some common boxes found in TrackBox (e.g., 'stsd', 'trgr', 'tref', etc.) is defined.

Dynamic Movie Box

DynamicMovieBox 600 may contain zero or more UserDataBox 620 or MetaBox 630 as defined in ISOBMFF. It is identified by a 4CC code, for example 'dymv' or any dedicated 4CC reserved for this use and not conflicting with existing 4CC.

A DynamicMovieBox completely or partially overrides the MovieBox setup (track list, user data, or meta) for a given fragment. This MovieBox setup may also be called the "track configuration". This mode (partial or complete overriding of the track configuration or extension of the track configuration) may be indicated in a parameter (e.g as a flag or a field within a Box or FullBox) of the DynamicMovieBox box. This parameter may be called for example "source_id" or "carousel_id". For example, this parameter may be an identifier of a presentation and/or may be repeated along a presentation or part (temporal interval) of a sequence. Each DynamicMovieBox may have an associated source_id, which indicates how the movie fragment extends or modifies the initial MovieBox ('moov') or a previous DynamicMovieBox ('dymv'). A source_id equal to 0 may indicate that the MovieBox is extended by the movie fragment. A source_id different from 0 may indicate that the MovieBox is ignored (i.e. considered not present or no more active for the given movie fragment).

For example, this parameter of the DynamicMovieBox box may be set by the encapsulation module to indicate the presence of fields allowing to inform players about whether a track configuration is a repetition or not, whether it complements, overloads, or invalidates a track configuration possibly present in the 'moov' box or in a previous movie fragment. This box may be present in movie fragments or may be present only in the first movie fragment of an ISOBMFF segment (e.g. a segment with dependent movie fragments). As such, there may be zero or more DynamicMovieBox in a media file, but no more than one DynamicMovieBox per MovieFragment Box ('moof'). When used in a first movie fragment of a segment containing dependent movie fragments, the dependent movie fragments may inherit the track declaration (DynamicMovieBox, DynamicTrackBox, DynamicTrackHeaderBox) from this first movie fragment, in addition to other properties of this first movie fragment.

For DynamicMovieBox, the following flags may be defined:

0x000001, denoted source-info-present, if set, it indicates that source information (or carousel-like or carousel information) is present; if not set, both source_id and source_flags take the value 0. Source information, "Carousel-like", or carousel information corresponds to information that may be repeated in movie fragments, 0x000002, denoted in-splice, if set, it indicates that the tracks described in the DynamicMovieBox correspond to a content splice period, which will soon move back to the previous configuration. By monitoring this flag and the source_id field, the processing media pipeline can be optimized if desired (e.g. to avoid unloading/reloading decoder resources for instance). This flag should not be set if source_id is 0. This is because source_id=0 indicates some continuity in the initial presentation, for example in the presentation timeline.

A DynamicMovieBox with source_id different from 0 may contain zero or more DynamicTrackBox. When dynamic tracks are used, the first track fragment ('traf') of each track in the parent movie fragment ('moof') should have a TrackFragmentBaseMediaDecodeTimeBox ('tfdt') box present. This may facilitate time adjustment by readers or players between two different presentations. When the encapsulation module inserts a DynamicMovieBox with source_id different from 0 in a movie fragment, it may be an indication to players or readers that there may be a discontinuity (for example in the presentation timeline) between two movie fragments. It may be used as an indication to players or readers to forget about previous encountered source_id that it may have recorded (along with corresponding decoder configurations) because the encapsulation module may reuse source_id that it previously used. Thus, a DynamicMovieBox with source_id different than 0 and without any DynamicTrackBox is a kind of indication that there is no continuity between values of source_id before and after the movie fragment containing such DynamicMovieBox.

Optionally or as a variant to flags value 0x000002, a third flag value may be used (for example 0x000004) to indicate that, when set, the track configuration is temporary and will soon move back to the 'moov' configuration.

Optionally or as a variant to flags value 0x000002, another flags value may be used (for example 0x000008) to indicate that, when set, the track configuration is temporary and will soon move back to a track configuration of a previous movie fragment.

With these additional flags values, parsers or readers may have finer handling of decoder configurations and may decide to buffer more or less configurations to avoid some decoder resets and possibly display freeze. For example, when flags value 0x000004 is set, it means that decoder may keep only the initial decoder configuration, corresponding to the one deduced from the 'moov' box.

Examples of Syntax for the DynamicMovieBox

According to a first example, fields and boxes are mixed as follows:

```
aligned(8) class    DynamicMovieBox    extends FullBox('dymv',
version=0, flags){
    if (flags & 1) {
        unsigned int(32) source_id;
        unsigned int(32) source_flags;
    }
    DynamicTrackBox    tracks;        // optional: zero or more
    UserDataBox        user_data;     // optional: zero or one
    MetaBox            meta; // optional: zero or one
}
```

According to a second syntax example, the DynamicMovieBox box contains only boxes, as such, and may inherit from Box instead of FullBox:

```
aligned(8) class DynamicMovieBox extends Box('dymv'){
    DynamicMovieBoxHeader dyn_movie_header; // zero or one.
    DynamicTrackBox        tracks;      // optional: zero or more
    UserDataBox            user_data;   // optional: zero or one
    MetaBox                meta;        // optional: zero or one
}
```

With DynamicMovieBoxHeader being a Box or FullBox providing fields equivalent to the source_id and source_flags from the first example, the DynamicMovieBoxHeader may be defined as follows:

```
aligned (8) class DynamicMovieHeaderBox extends FullBox('dymv',
version=0, flags) {
    if (flags & 1) {
        unsigned int (32) source_id;
        unsigned int (32) source_flags;
    }
// possibly other fields providing information on the track
configuration or common information to all tracks of the track
configuration.
}
```

When the DynamicMovieHeaderBox is not present, a parser or reader may assume a new track configuration simply indicating that the 'moov' configuration applies for this movie fragment. The DynamicMovieHeaderBox may contain additional parameters providing parameters applying to all tracks within the new track configuration, for example a timescale or language or a transformation matrix (as in the MovieHeaderBox 'mvhd') indication.

The semantics for the DynamicMovieBox may be defined as follows:

source_id (or carousel_id, name is just an example) referenced 604 in FIG. 6a identifies the origin (for example a presentation) of a movie fragment. If it is set to 0, the DynamicMovieBox alters the MovieBox (e.g. invalidate, overwrite, add, or replace some tracks or change sample description or high-level metadata). Otherwise, all tracks, user data, and possibly high-level metadata declared in the MovieBox should be ignored. In other words, when the value of this field is different than 0, the DynamicMovieBox indicates a new track configuration or a new presentation for one or more movie fragments (as many as this value is repeated in movie fragments). This field, when set to 0, may be seen by parsers or readers as an indication that the media, or the presentation, keeps the same timeline, the same set of track identifiers as in the 'moov' possibly with new ones or some being overridden. This field, when different than 0, may be interpreted by parsers or readers as a complete change of track configuration, possibly with a change of the presentation timeline. The default value for source_id, for example when not declared, is assumed to be 0.

source_flags (or carousel_flags, name is just an example), referenced 605 in FIG. 6a, identify the modifications declared in this DynamicMovieBox compared a previous DynamicMovieBox with the same value of source_id, if any. The following flags may be defined to be set or combined in the value of source_flags parameter:

0x00000001, if set, indicates that one or more track(s) have changed. For example, one or more tracks have been added, overloaded, or invalidated (temporary removed), 0x00000002, if set, indicates that global user data (e.g. a user data box for the whole presentation, for example in a 'moov' box or in a DynamicMovieBox 'dymv' box) has changed, 0x00000004, if set, indicates that the global meta box (e.g metadata for the whole presentation, for example in a 'moov' box or in a DynamicMovieBox 'dymv' box). has changed, 0x00800000, if set, indicates that the modifications (for the presentation or the track configuration) are functionally equivalent to the previous DynamicMovieBox with the same source_id. In this case, a file reader or parser may safely skip processing the DynamicMovie-Box if the previously parsed DynamicMovieBox has the same source_id. In other words, a reader or parser may decide not to parse a track configuration indicated in a DynamicMovieBox with this flags value that is set when it has already processed one with same source_id. It also indicates that player can safely keep on using decoder configurations, so avoiding decoder handling, for example reset or reinitialization to another configuration (codec change, profile or level change, etc.) and skipping step 522 or 505 in FIG. 5. The default value for source_flags, for example when not declared, is assumed to be 0. It is to be noted that when source_id is equal to 0, the value of source_flags may be set to 0 or 0x00800000. This is because source_id equal to 0 means that the presentation declared in the 'moov' is active (is the current one) and then, if a track configuration change is indicated using DynamicMovieBox, there is no need to further indicate that, for example the track configuration has changed because a player would have to process it, unless it has encountered this track configuration already and that the flags value 0x00800000 is set. The source_flags' value may be set to 0x00800000 but should be ignored (i.e. considered as not set) by file readers when the previous Dynam-icMovieBox has a different source_id or when this is the first DynamicMovieBox parsed.

A change of the source_id value between two consecutive movie fragments N and N−1 in a single bytes sequence (file, remote resource, etc.) is an indication for readers or players that the tracks in fragment N should be considered as new tracks and that the tracks in fragment N−1 should be ignored. In this case, there is no guarantee that the timeline is contiguous between fragments N and N−1. Whether and/or how file readers reconstruct a continuous timeline in such cases (for example between fragments N and N−1) is implementation dependent (i.e. it may not be standardized) and may be driven by the processing pipeline capabilities. For these reconstructions, implementations should however avoid introducing long playback gaps at source_id change points. For example, a parser or reader may decide to recompute timing (e.g. by using sample description, through 'tfdt' or any box for timing indication, by using some edit list, etc.).

If two consecutive movie fragments N and N−1 have the same value for source_id, the timeline of all the tracks active in both fragments may be interpreted by readers or parsers as being contiguous, and the constraints on TrackFragment-BaseMediaDecode TimeBox of each track may be respected: for a track fragment with the same trackID, the first 'tfdt' in movie fragment N is equal to or greater than the first 'tfdt' in movie fragment N−1 plus the sum of the sample durations in movie fragment N−1. If several tracks need to be inserted or replaced, these tracks may all be declared in a single DynamicMovieBox, each one in its own Dynam-icMovieBox, or according to a mix of both approaches.

If a track from the MovieBox is not listed either for update or removal in one of the DynamicTrackBox of a Dynam-icMovieBox with source_id value of 0, this track is considered as still valid, but there could be no track fragment for this track in the movie fragment, as it is the case with regular movie fragments.

In a variant, DynamicMovieBox 600 may be a top-level box for a segment or fragment. This allows mutualizing the declaration of the track configuration across multiple movie fragments. This may be suitable for encapsulation in which there is one track per movie fragment. This may be less suitable for encapsulation in which one 'moof' contains all the tracks. The same fields and sub-boxes may be used in a DynamicMovieBox that is declared as a top-level box. It is another variant to indicate (e.g., step 420 in FIG. 4) or to identify (e.g., step 501 in FIG. 5) that a media file is fully dynamic when, instead of a 'moov' box, one of the top-level box is a DynamicMovieBox. When using DynamicMovie-Box 600 as a top-level box, SegmentIndexBox, when present, may reference the beginning of the DynamicMovieBox instead of, or in addition to, the 'moof' box. This may be indicated by a specific (new value) reference_type in 'sidx' box.

Dynamic Track Box

DynamicTrackBox 601 may contain zero or more Boxes as illustrated in FIG. 6a. It is identified by a 4CC code, for example 'dytk' or any dedicated 4CC reserved for this use and not conflicting with existing 4CC. It provides a lighter track declaration than the 'trak' box and its sub-boxes. Since it may be repeated along the media presentation, some fields or sub-boxes may not be always present thus providing a more compact track description than the one in 'moov' and 'trak' boxes. A DynamicTrackBox declares a new track or modifies (e.g. overwrite partially or completely) or replaces an existing track for the duration of the parent movie fragment.

The tracks declared by a DynamicTrackBox, and for which there are no track with a matching track_ID in the MovieBox, implicitly declare a TrackExtendsBox with the value default_sample_description_index set to 1 and the values default_sample_duration, default_sample_size, and default_sample_flags set to 0. Likewise, tracks declared by a DynamicTrackBox and for which the associated source_id is not equal to 0 may also implicitly declare these boxes. This allows to define default values for the track run boxes describing the samples for these tracks. It is noted that default values may need to be set in the TrackFragment-HeaderBox (since no explicit TrackExtendsBox); if multiple track fragments are used for a dynamic track within one movie fragment, the default values may need to be re-coded for each track fragment. There may be zero or more Dynam-icTrackBox 601 contained in DynamicMovieBox 600. A DynamicTrackBox contains a DynamicTrackHeaderBox, referenced 602 in FIGS. 6a and 6b, providing track information.

A variant to implicit declaration of a TrackExtendsBox is to declare this box within the 'dymv' box. Combined with a source_flags value (a dedicated one indicating that 'trex' or default values used by movie fragments have not changed between two movie fragments or segments), it is possible to indicate when the default values change or still apply from one movie fragment to another.

The semantics for the DynamicTrackBox may be defined as follows:

data_info, if present, gives the source(s) or location of the samples' data for this dynamic track. If not present, the samples' data are present in the container (a media data box). The location of the data may be indicated by an URL or URN or any kind of data entry inheriting from DataEntryBaseBox, and minf_header_info, if present, gives the media-specific header box usually found in the MediaInformationBox of a track with the same handler_type as this dynamic track. Derived specification may mandate its presence. It may be any one of specific media handler ('vmhd', 'smhd', 'hmhd', 'sthd', 'nmhd', 'vvhd', etc. defined by ISOBMFF, or derived specifications).

The other boxes contained in the DynamicTrackBox have unchanged semantics compared to the one specified in ISO/IEC 14496-12, except the DynamicTrackHeaderBox that is explained hereafter. When present, they replace their counterpart boxes in the TrackBox (and sub-boxes) of the MovieBox, or of the previous DynamicTrackBox.

Dynamic Track Header Box

FIG. 6b illustrates an example of syntax for a DynamicTrackHeaderBox, for example DynamicTrackHeaderBox 602 in FIG. 6a. A DynamicTrackBox can be used to disable an existing track from the MovieBox (or an existing track from a previous DynamicMovieBox), override or replace the definition of an existing track from the MovieBox (or of an existing track in a previous DynamicMovieBox) or define a completely new track. As illustrated, DynamicTrackHeaderBox 602 may contain track identification (e.g. a track_ID) and overall information about a track. It is identified by a 4CC code, for example 'dtkh' or any dedicated 4CC reserved for this use and not conflicting with existing 4CC. It provides a lighter track header declaration than the 'tkhd' box and the sub-boxes of the 'trak' box. Since it may be repeated along the media presentation, some fields or sub-boxes may not be always present thus providing a more compact track description than the one in 'moov'. In other words, a DynamicTrackBox may be considered as a compaction of TrackHeaderBox, EditListBox and MediaHeaderBox in a single container, in order to keep the track signalling overhead low.

A DynamicTrackHeaderBox is contained in each DynamicTrackBox.

The following flags may be defined for a dynamic track header box (values for the flags field 602-1 of the DynamicTrackHeaderBox):

0x000001, denoted ignore_track (or dyn_tk_ignore_track), this value, when set, indicates that the track declared in the MovieBox or in a previous DynamicMovieBox with the same source_id as the parent DynamicMovieBox should be ignored (treated as if not present) until a next movie fragment is received for this track.

This flags value may, for example, be used in "non-blind splicing" mode.

If flags value 0x000001 (ignore_track or dyn_tk_ignore_track), is not set in DynamicTrackHeaderBox, the parent DynamicTrackBox overrides an existing track or declares a new track. In this case:

if a 'stsd' box is present in the parent DynamicTrackBox:
if there is a track with same ID in the MovieBox, overwrite it with current track, otherwise add the new track to the presentation,
NOTE1: derived specification can mandate that the handler type/timescale/width/height remain the same in this case,
NOTE2: this is typically used to update a sample description for a track,
if 'stsd' box is not present in the parent DynamicTrackBox: there should be a track with same ID in the MovieBox and all fields in DynamicTrackHeaderBox should match their corresponding fields in the track/handler/media header boxes declared in the MovieBox. This may be used to update UserDataBox, MetaBox, TrackReferenceBox or TrackGroupBox of the track. The sample descriptions of the track remain unchanged in this case. With such an indication, a player or reader may assume that no decoder reset is required. An additional flags value may be defined to indicate that a track header has changed but remains functionally equivalent to the previous occurrence of this track header (same track_ID in a 'dytk' within a 'dymv' with same source_id value). As for some values used for DynamicMovieBox or DynamicTrackBox, the value 0x800000 may be used here. This may be used, for example when the volume information changes or when some parameters not affecting a decoder configuration has changed. For the case where no 'stsd' box is present, a dedicated flag could also be used to avoid re-listing elements that match elements of the 'moof's track.

The semantics of DynamicTrackHeaderBox may be:

track_ID indicates the ID for the track declaration. It may be a track_ID already declared in a TrakBox under the moov box (for track removal or track overloading) or a new track_ID (for track addition), modification_flags 602-2 identify the modifications in the parent DynamicTrackBox compared to the previous DynamicTrackBox with the same value of track ID and the same value of source_id in the parent DynamicMovieBox. These flags may be used by the reader to optimize processing of consecutive track fragments with the same track_id and source_id.

The following flags may be defined (for the modification_flags 602-2):

0x000001: the track configuration has changed (changes in one or more fields other than modification_flags in DynamicTrackHeaderBox, changes in the associated media header box ('vmhd', 'smhd', etc.)), or changes in the associated data information box),
0x000002: the media configuration has changed (e.g. new sample description),
0x000004: the track UserDataBox has changed,
0x000008: the track MetaBox has changed,
0x000010: the track TrackReferenceBox has changed,
0x000020: the track TrackGroupBox has changed,
0x800000: the track modifications are functionally equivalent to the previous DynamicTrackBox with the same track_id and source_id, This flag may be set in 602-2 by the encapsulation module but should be ignored (i.e. considered as not set) by file readers when the previous DynamicMovieBox has a different source_id or when this is the first DynamicTrackBox parsed for this track_id and source_id. When modification_flags is not set (either explicitly or per the above rule) or has the value 0, there is no information available on possible changes of the track compared to previous DynamicTrackBox with the same track_id and source_id and the entire content of the Dynamic-TrackBox must be re-evaluated.

handler_type same as handler_type in HandlerBox, media_timescale same as timescale in MediaHeaderBox, delay indicates media delay of the track, in media_timescale. The presentation time of any sample in the track is the sum of the composition time of the sample and this value. A negative presentation time indicates that (part of) the sample data shall not be presented (media skip), If not coded, the value 0 can be used by parser or reader.

track_flags same as flags in TrackHeaderBox. If this field is not coded and there is no matching track with the same track_ID in the MovieBox, this field value is inferred to be 0x000003, language same as language in MediaHeaderBox, extended_language same as in ExtendedLanguageBox, alternate_group same as in TrackHeaderBox, width same as in TrackHeaderBox, if not coded, the media width, after pixel aspect ratio and clean aperture applied, is used, height same as in TrackHeaderBox, if not coded, the media height, after pixel aspect ratio and clean aperture applied, is used, layer same as in TrackHeaderBox, if not coded, the layer is 0, matrix same as in TrackHeaderBox, if not coded, the identity matrix is used, and volume same as in TrackHeaderBox, if not coded, full volume (1.0) is used.

When using the new boxes from FIGS. 6a and 6b, signalling a new track in simple cases may cost STSD plus:

12 bytes for DynamicTrackHeaderBox header, 17 bytes for audio (no volume), 27 bytes for video with size/layer and without track matrix (63 with matrix), 8 bytes for DynamicTrackBox header, and 12 bytes for DynamicMovieBox header.

The overhead for one second fragment is estimated around 0.392 kbps for audio, 0.47 kbps for video (0.76 kbps if full visual matrix is specified) hence roughly 1.3 kbps for full signaling (track and 'stsd') versus more than 4 kbps if new tracks would be described with the classical TrackBox.

According to some embodiments of the invention, the signaling to indicate the removal of a track is estimated, for one second fragments, to 12 plus 4 plus 8 plus 12 bytes, i.e 0.288 kbps.

Moreover, the proposed boxes allow efficient signaling of track addition, provide a unified approach to add tracks in a presentation or to change a codec configuration. It allows track removal (or signaling temporarily invalid tracks or non-active tracks) and the various flags in DynamicMovie-Box or DynamicTrackHeaderBox allow parsers or readers to easily detect repeated or changed track configurations as well as the temporary changes in the track configuration, e.g. splicing periods (temporal interval where a new presentation replaces a previous one, for example an advert in a movie).

The proposed boxes may be combined with movie fragments that would depend on reference movie fragments.

Assuming that so-dependent movie fragments would be signaled by a specific version, for example as follows:

```
aligned(8) class MovieFragmentHeaderBox
    extends FullBox('mfhd', version, 0){
    unsigned int(32)sequence_number;
}
```

If version is not 0, any SampleGroupDescriptionBox, DynamicTrackBox or MetaBox defined in the last movie fragment, or in the last TrackFragment in the last movie fragment, whose MovieFragmentHeaderBox version is 0 also apply for this movie fragment, and there shall not be any SampleGroupDescriptionBox, DynamicTrackBox or Meta-Box defined for this movie fragment. It is to be noted that the flags field could be used as a variant to the version field. This may be more convenient if the MovieFragmentHeaderBox needs to be extended with new fields, preferably enclosed within a version number.

Example of Track Removal

Figure 7:
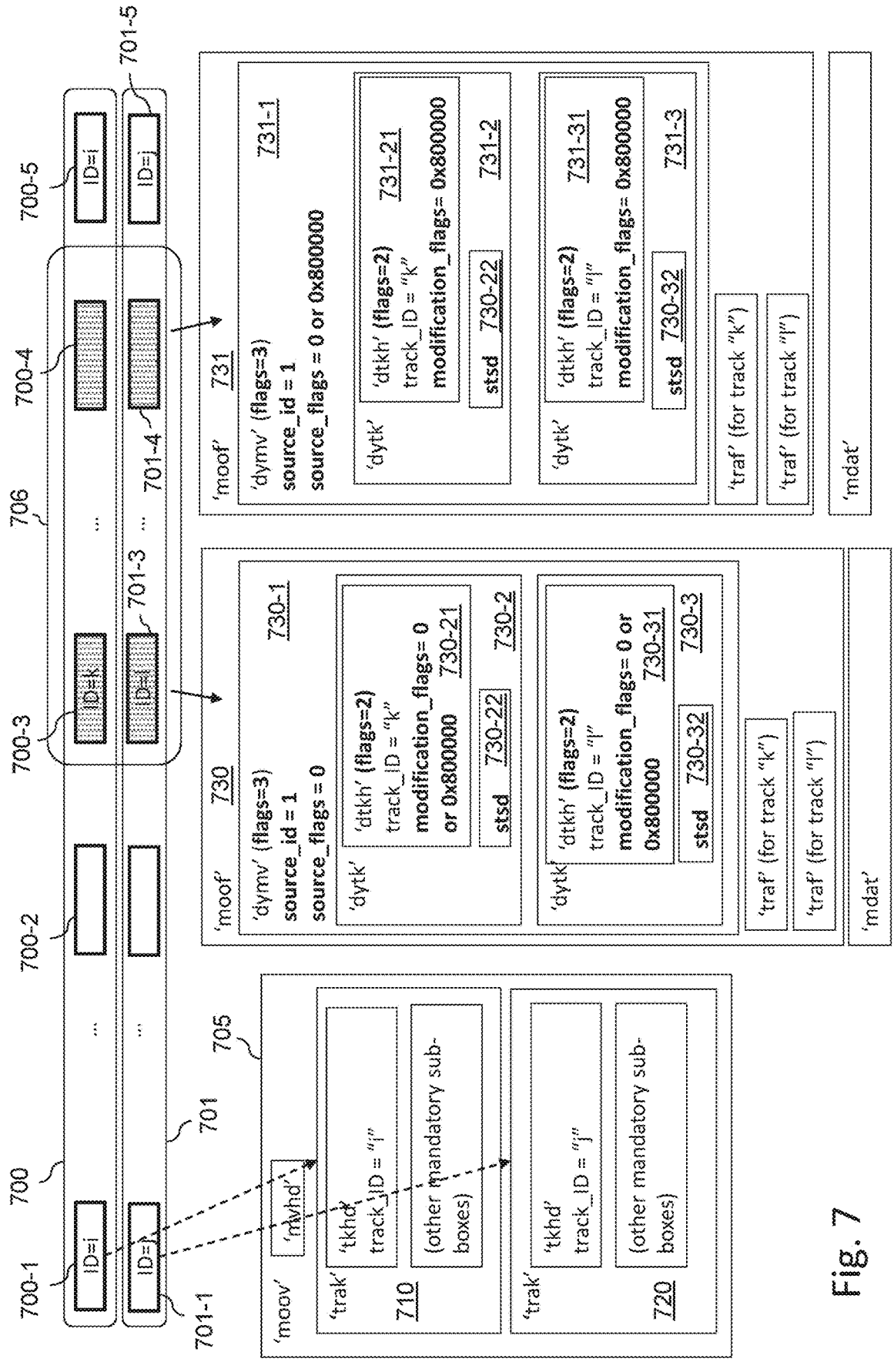
FIG. 7 illustrates an example of track configuration invalidating tracks declared in a 'moov' box.

FIG. 7 illustrates an example of track configuration invalidating tracks declared in a 'moov' box. In this example, two tracks represented as 700 and 701 are initially declared in the 'moov' (705) and 'trak' (710, 720) boxes, with track_ID="i" and "j". As illustrated, the tracks are fragmented in movie fragments 700-1, 700-2, etc. to 700-5 and 701-1 to 701-5. These tracks are initially described in 'trak' boxes 710 and 720 in 'moov' box 705. They may correspond, for example, to a first media source or presentation that may be considered as a main media source (for example a movie or a sport live event).

From movie fragments 700-3 and 701-3, a new track configuration is indicated in the media file (in the 'moof' box 730) to invalidate the tracks declared in 'moov' box 705 (with track_IDs "i" and "j"). The new content, referenced 706, may correspond to second media source, splicing, or alternative content to the first or main media source, encapsulated for example at step 407 in FIG. 4. The new track configuration is signalled in the media file as the DynamicMovieBox 730-1 and repeated in DynamicMovieBox 731-1 (as indicated by the same value of source_id) and in DynamicMovieTrackBox boxes 730-2 and 730-3 and in DynamicMovieTrackBox boxes 731-2 and 731-3. As illustrated, DynamicMovieBox 730-1 has its fields indicating the override of the initial configuration that is set. In the example of FIG. 7, this corresponds to the source_id field having a value different than 0 (here 1). DynamicMovieBox 730-1 indicates, for example in the source_flags field, what are the changes for this movie fragment (if any). In this example, the value may be set to 0, indicating that no further information is provided in the DynamicMovieBox on the track configuration change. Indeed, since this is the first occurrence of a 'dymv' box with this identifier (source_id) value, the indication of what information is present or may have changed may be omitted (e.g. source_flags=0). It is an indication to players or readers that this first occurrence should be processed whatever the indication of the changes through the source_flags field (here 0, but could have taken a different value).

The two DynamicTrackBox referenced 730-2 and 730-3 declare the new tracks with track_ID="k" and "I". These two boxes have in their header a modification_flags indicating no change (0 or 0x800000) since this is the first occurrence of this track ID for this source_id (or presentation). Value 0 is an indication that players or readers should process the track description (parameters in 'dytk' 730-2 or 730-3 and in 'dtkh', 730-21 or 730-31). The sample descriptions for these new tracks are provided in 'stsd' boxes 730-22 and 730-32. It provides for example information on the codecs, profiles, or levels values for player or reader to setup their decoder. These sample descriptions may require decoder reset or creation of new decoder configuration to handle the samples of these new tracks "k" or "l".

Next, for each fragment until fragments 700-4 and 701-4, the track configuration is repeated to provide random accesses. However, to avoid useless processing for players having started at fragments 700-3 and 701-3 or before, the source_id is kept to the same value (here 1) and the source_flags can be set to 0x800000 (or even 0) in DynamicMovieBox box 731-1 to indicate that the track configuration is the same as the previous track configuration as defined in DynamicMovieBox box 730-1 having the same value of source_id (here value 1). Using 0 or 0x800000 leads to the same parser or reader behaviour: if it has already processed a track configuration with this source_id value, it may ignore the boxes indicating and describing the track configuration (DynamicMovieBox 731-1 and its sub-boxes 731-3). Using 0x800000 would provide finer information than the value 0, indicating that there may have changes in the track configuration but these are minor configurations. For example, modifications concern high-level metadata or user data but do not impact number of tracks, or the configurations of the decoder(s). Likewise, the details for track information in DynamicTrackBox boxes 731-2 or 731-3 indicate a modification_flags to 0x800000 indicating that the track configuration is almost the same as in the previous fragment or at least that it does not require a decoder reset or reconfiguration. The 'stsd' boxes 730-22 and 730-32 are still present, for player or reader randomly accessing onto this movie fragment 700-4 or 701-4, to obtain the sample description for tracks "k" or "l". While a focus has been made here on the possible values for source_id, source_flags or modification_flags, it is noted that other parameters from the DynamicTrackBox or DynamicTrackHeaderBox may also be specified in these boxes (for example, the ones represented on FIGS. 6a and 6b, not represented for the sake of clarity). It is also noted that the presence of 'stsd' boxes 730-22 and 730-32 may be optional when the fragments 700-4 and 701-4 are dependent movie fragments (since a player cannot randomly access the bitstream starting from these fragments).

For movie fragments from 700-5 or 701-5, there is no DynamicMovieBox box that may be used as an indication to the player or reader to consider that the configuration defined in the 'moov' box 705 applies or resumes or is restored. The decoders setup for track "i" or "j" may then be restored to a previous configuration, for example in 505 or 522 in FIG. 5, if it was saved by the player or reader (or may be switched from one configuration to another if the player or reader maintains several configurations). It is noted that the player or reader may decide to store the decoder configurations depending on the value of the flags field of DynamicMovieBox box 730-1 or 731-1. In the example, the flags value is set to 3 (0x000003), meaning that the configuration change is temporary and may come back to a previous configuration (here the one defined in the 'moov' box 705). It is also noted that additional values defined in variants described in relation to the DynamicMovieBox could also be set here. Likewise, for the DynamicTrackHeaderBox boxes 730-21, 730-31, 731-21 or 731-31, the flags value is set to 2 (0x000002) to further indicate a modification_flags. Alternatively, in this example, the flags value could have been set to 0, thus avoiding the declaration of the modification_flags, especially on fragments 700-3 and 701-3 (first occurrence of the new track declaration). Having the flags value equal to 2 in the DynamicTrackHeaderBox in consecutive fragments can be useful provided that source_flags in the parent 'dymv' is not 0 or 0x800000, in order to further indicate the changes for the track configuration, at track level.

For the sake of clarity, not all the DynamicMovieBox and DynamicTrackBox boxes are represented on FIG. 7. According to some embodiments of the invention, there should be one DynamicMovieBox box per movie fragment, with one DynamicTrackBox box for each track, occurring between movie fragment 700-3 or 701-3 and movie fragment 700-4 or 701-4. It is also noted that the modification_flags value in the repeated occurrences of a DynamicTrackBox between movie fragment 700-3 or 701-3 and movie fragment 700-4 or 701-4 may have its value set either to 0 or 0x800000 when no change requiring decoder re-initialization occurs in the corresponding track from one movie fragment to another. If a change occurs, the value of modification_flags should be set accordingly. Using value 0x800000 instead of 0 brings some flexibility in the sense that value 0 would indicate no change at all whereas value 0x800000 would indicate "minor" changes, at least that do not require to reset decoder. Of course, values 0 or 0x800000 are examples, other values could be used for the same purpose provided that they are specified for this usage. The usual boxes within a 'moof' box like 'traf', 'trun', etc. are not described since they apply as defined by ISOBMFF, except that the track_ID may also refer track_IDs from the 'dytk' boxes included in the movie fragments. In the example of FIG. 7, the 'traf' boxes refer respectively to tracks "k" and "l" for fragments 700-3 to 700-4 and 701-3 to 701-4. This sequence of movie fragments 706 represents a second presentation (for example an advert) that is spliced to the first or main presentation (for example a movie).

Figure 8:
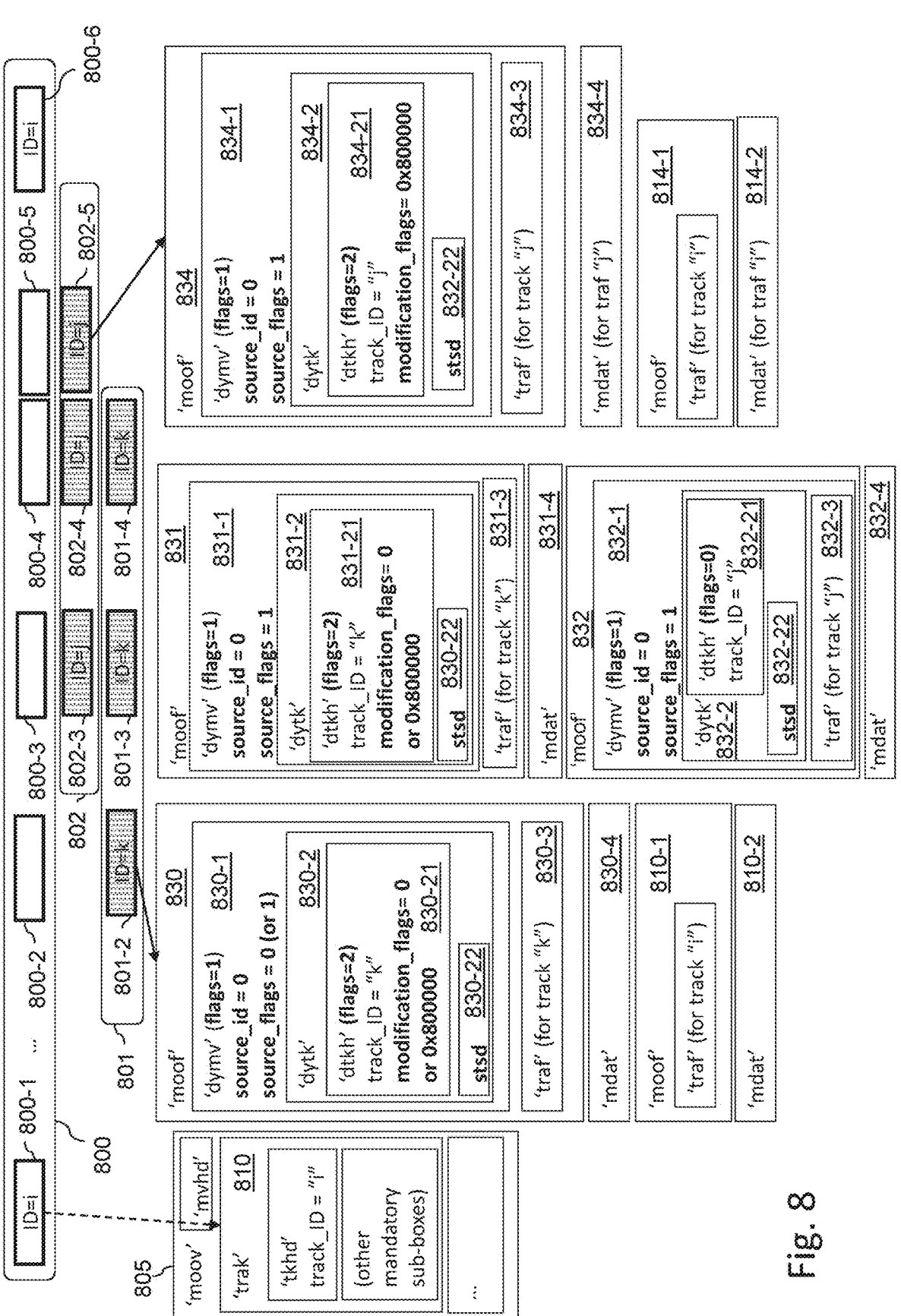
FIGS. 8 and 9 are other examples of use of some embodiments of the invention.

FIG. 8 is another example of use of some embodiments of the invention illustrating the addition of tracks, each in its own movie fragment. According to this example, one or more tracks for a first presentation are declared in a 'moov' box 805 (for the sake of clarity, only one track referenced 800, with track_ID="i", is represented). As illustrated, track 800 comprises several movie fragments such as movie fragments 800-1 to 800-6. The track 800 is declared with its corresponding TrackBox 810 and sub-boxes.

At a certain point in the presentation timeline corresponding to movie fragment 800-2, a first new track is added (track 801, with track_ID="k"). This track is also made up of one or more movie fragments 801-2 to 801-4. This addition of a new track is indicated by the encapsulation module with a DynamicMovieBox 830-1. This DynamicMovieBox has a flags value set to 1 to indicate that a source_id value is present. The source_id is here set to value 0 to indicate that the track configuration declared in 'moov' 805 is modified, here with the addition of new track 801 that is described in DynamicTrackBox 830-2 and DynamicTrackHeaderBox 830-21. The source_flags parameter of the DynamicMovieBox 830-1 can be set to 0 (no indication on the track configuration change) or to 1 to indicate that the change consists in a change in the number of tracks. The DynamicMovieBox contains a DynamicTrackBox 830-2 itself containing a DynamicTrackHeaderBox 830-21 and at least a sample description box 'stsd' 830-22. The flags value set to 2 in the DynamicTrackHeaderBox 830-21 indicates that further information on the track modification is provided in a modification_flags parameter. Here, value 0 or 0x00800000 indicates that no significant modification occurred, since this is the first occurrence. An alternative could be to encode flags value 0 for the DynamicTrack-HeaderBox 830-21, without indication of the modification_flags. 'moof' 830 contains 'traf' box 830-3 referencing the new track (with track_ID="k") and its associated media data box 830-4 is also put in the media file. Finally, the movie fragment for the track "i" is also available as 'moof' 810-1 and its associated media data box 810-2. This movie fragment 810-1 does not need specific indication like 'dymv', 'dytk', or 'dtkh'.

Later in the presentation timeline, at the time corresponding to movie fragment 800-3, another additional track 802 is introduced, with track_ID="j". The movie fragments described for the time period are movie fragments for tracks "i" (not represented, a classical 'moof' box like 810-1 and 'mdat' box like 810-2), "j" (832) and "k" (831). Movie fragment 831 contains DynamicMovieBox 831-1 with a source_id (e.g. equal 0) indicating that the track configuration from the 'moov' is modified again (e.g. track addition here). The source_flags of DynamicMovieBox 831-1 is set to 1 to indicate that there is a change in the track configuration: the addition of the new track "j" referenced 802. DynamicTrackBox 831-2 repeats the sample description to allow random access and its DynamicTrackHeaderBox referenced 831-21 indicates that no modification occurred for track "k" since the last movie fragment with a DynamicMovieBox with source_id equal to 0. This may be indicated by a modification_flags value 0 or 0x00800000 or simply by setting the flags value of the 'dtkh' 831-21 to 0. 'moof' 831 contains one or more classical 'traf' box 831-3 referencing the track_ID "k" and the associated media data are provided in 'mdat' box 831-4. 'moof' 832 contains DynamicMovieBox 832-1 with a source_id set to value 0 to indicate that the track configuration changes. The source flags can be set to 1 to indicate a change in the number or tracks, i.e. the addition of track "j". DynamicMovieBox 832-1 contains DynamicTrackBox 832-2 that itself contains DynamicTrackHeaderBox 832-21 with a flags that can be set to 0 since it is the first occurrence for track_ID="j". DynamicTrackBox 832-2 also contains a sample description in 'stsd' box 832-22, for a player or reader to obtain information on the samples, on the codecs in use, etc. Finally, 'moof' 832 contains one or more 'traf' 832-3 boxes referencing the new track "j" and other fragment related boxes defined by ISOBMFF (e.g. 'trun', etc.) and its associated media data box 832-4.

At the time corresponding to movie fragment 800-4, the two new tracks "j" and "k" are still present. A dynamic movie box is present in their respective 'moof' box (not represented). The flags for the DynamicMovieBox still has the source_id set to 0 and source_flags set to 0 as well to indicate that the track configuration from 800-3, 801-3 and 802-3 repeats for the current time interval. Each DynamicMovieBox has a DynamicTrackBox with flags appropriately set to indicate that no change occurred for example. Sample description boxes 830-22 and 832-22 are still present in their respective DynamicTrackBox to guarantee random access at the time corresponding to movie fragment 800-4.

At the time corresponding to movie fragment 800-5 or 802-5, the track "k" is no more present. Accordingly, DynamicMovieBox 834-1 (in 'moof' box 834) indicates a change in the number of tracks (track "k" no more present) with a source_id=0 and a source_flags=1. DynamicMovieBox 834-1 contains DynamicTrackBox 834-2 with sample description 832-22 (repeated from fragment 802-3) possibly with other boxes (not represented). DynamicTrackBox 834-2 contains DynamicTrackHeaderBox 834-21 with flags=2 to indicate the presence of the modification_flags. The modification_flags with value 0x00800000 indicates that no "significant" change occurred for this track "j". Then, classical boxes 'traf' 834-3 and 'mdat' 834-4 follow to provide description and data of the samples of fragments 802-5 and of the samples of fragments 800-5 (in 814-1 and 814-2).

At the time corresponding to movie fragment 800-6, only tracks from the 'moov' box remain. There is no need for any dynamic movie box or dynamic track box and the track configuration automatically switches back to the one declared in the 'moov' box 805.

Figure 9:
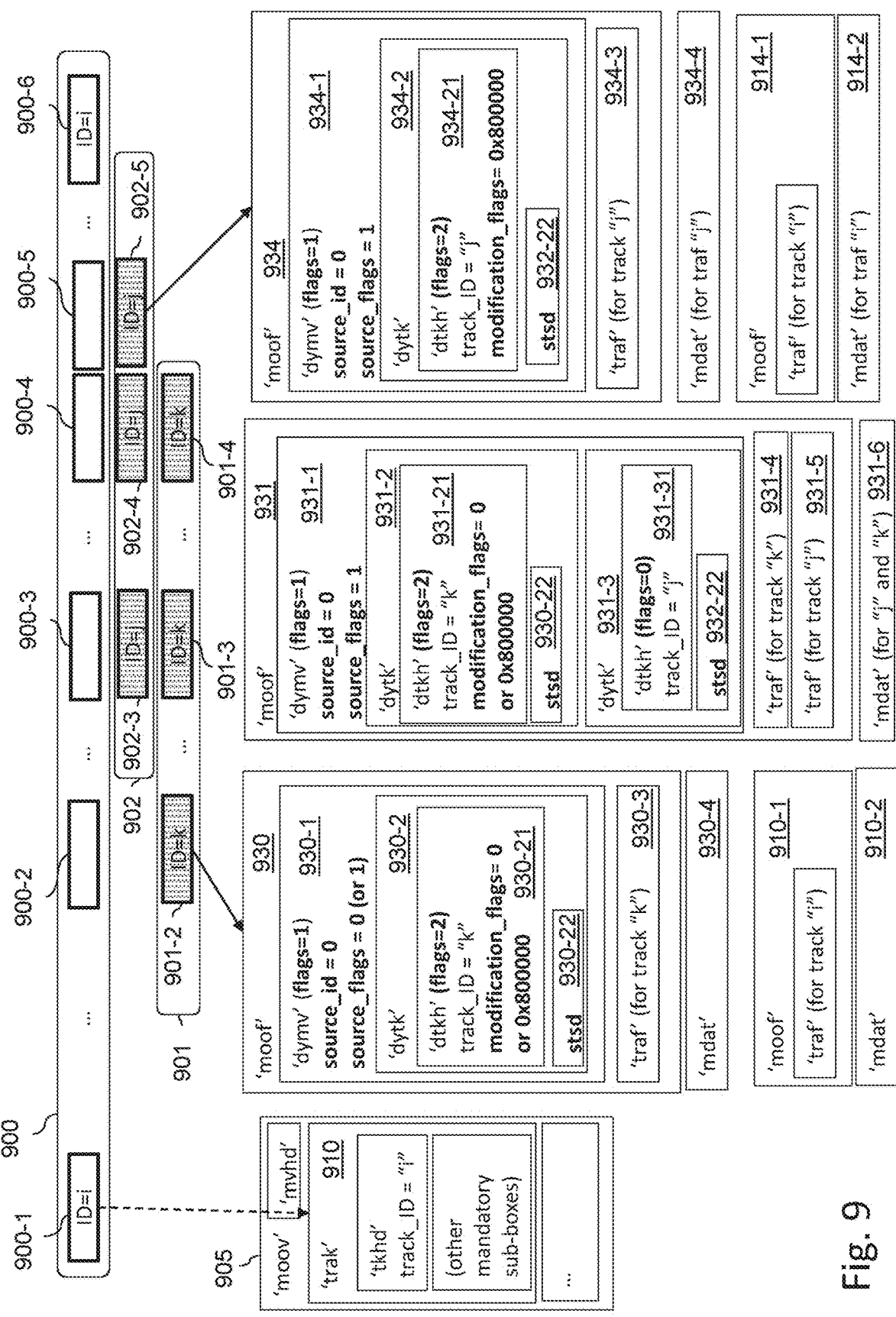

FIG. 9 illustrates the same scenario as in FIG. 8, except that the new tracks 902 and 901 (that are similar to tracks 802 and 801) are declared in a single 'moof' box. Accordingly, at the time corresponding to movie fragment 900-3 or 900-4, the two new tracks "j" and "k" are present and 'moof' box 931 contains DynamicMovieBox 931-1 that itself contains two DynamicTrackBox 931-2 and 931-3. Each contains a DynamicTrackHeaderBox, referenced 931-21 and 931-31, and sample description, referenced 931-22 and 932-22, respectively. The value of their flags field is respectively set to 2 (to indicate modification_flags) and 0 (first occurrence). The modification_flags for track "k" is set to 0 or 0x00800000 to indicate no change in this track, i.e. a continuation of this track. Next, each track "j" and "k" has its 'traf', referenced box 931-4 and 931-5, respectively, and the associated 'mdat' box 931-6. For the sake of clarity, the movie fragment for track "i", corresponding to 900-3 is not represented here. Finally, when only the new track "j" remains, in addition to track "i", DynamicMovieBox 934-1 contains only one DynamicTrackBox 934-2, the one for track "j". DynamicTrackHeaderBox 934-21 indicates no changes for track "i". The DynamicMovieBox 934-1 indicates a change in the track configuration (source_flags=1) that corresponds to the end of track 901 (the one with track_id="k").

Figure 10:
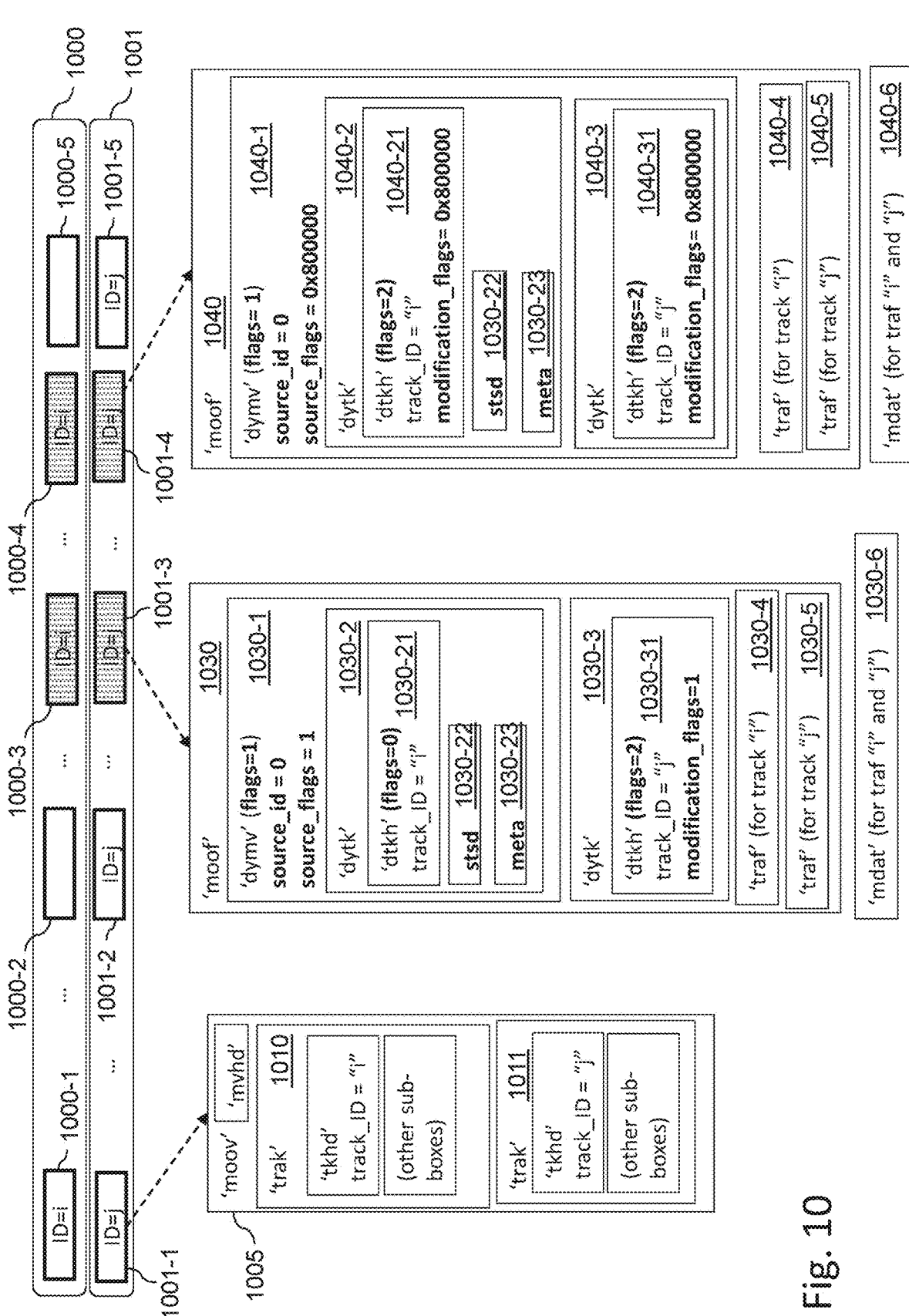
FIG. 10 illustrates another example of track configuration changes where tracks initially declared in a 'moov' box are overridden.

FIG. 10 illustrates another example of track configuration changes where tracks initially declared in a 'moov' box are overridden. This overriding may consist in updating the sample description, for example in changing the codec or in changing top-level metadata or user data for a track or some parameters of the track described in the track header. Such modifications may occur in non-blind or early splicing mode since it requires knowledge of the 'moov' box, in particular for reusing track_ID values.

According to the example illustrated in FIG. 10, the presentation contains one or more tracks as represented by 1000 (track_ID "i") and 1001 (track_ID "j"). These tracks are described in 'moov' box 1005 and its sub-boxes. Each track is fragmented (e.g., movie fragments 1000-1 to 1000-5 and 1001-1 to 1001-5). At some points in the presentation timeline (this may occur several times, even if only one occurrence is represented for the sake of conciseness), the presentation is modified by a new track configuration. For example, from fragments 1000-3 and 1001-3, a new content is injected. This change is indicated by the encapsulation module in the movie fragment box describing fragments 1001-3 and 1000-3. There may be one 'moof' box describing all the track fragments 1001-3 and 1000-3 or one 'moof' box per track fragment. The example illustrates the case of only one 'moof' box 1030. 'moof' box 1030 contains DynamicMovieBox 1030-1 with source_id=0 indicating that there is a track configuration change or a modification of the presentation. The source_flags, with value 1, indicates that changes occur at the track level. DynamicTrackBox 1030-2 indicates in its track header 1032-21 that track with ID equal to "i" is modified. The flags value of this box can be set to 0 since it is its first occurrence. Alternatively, it could be set to 2 with a modification_flags providing the changes: for example to indicate the overload of the 'stsd' box (flags value 0x000002 set in modification_flags) and to indicate a possible overload of the MetaBox of the track (flags value 0x000008 set in the modification_flags), thus leading to modification_flags=10, or a flags value 0x000003 if track layout changes.

DynamicTrackBox 1030-2 contains overloaded boxes 'stsd' 1030-22 and 'meta' 1030-23 providing the new definitions for the sample description and high-level metadata for the track "i" for the fragment duration. These new definitions replace the one declared in the 'moov' box for track "i" and apply for the duration of the fragment (1000-3). The flags value of the DynamicMovieBox (1030-1) is set to 1 to indicate that information for the source identification is present (the source_id parameter). The DynamicMovieBox 1030-1 also contains a second DynamicTrackBox 1030-3 indicating the changes for the track "j", for example a change in the track header information, as indicated by the modification_flags=1. It is noted here that since there is no new sample description (no 'stsd' box), the sample configuration from 'trak' box 1011 keeps on applying. 'moof' box 1030 also contains the classical 'traf' boxes (1030-4 and 1030-5) with their sub-boxes to describe sample offsets, sizes, durations, etc., samples data corresponding to fragments 1000-3 and 1001-3 being stored in 'mdat' box 1030-6.

At the time corresponding to fragments 1000-4 and 1001-4, the new track configuration declared for fragments 1000-3 and 1001-3 keeps on applying. Accordingly, 'moof' box 1040 contains DynamicMovieBox 1040-1 that has a source_flags indicating that no change occurred compared to previous track configuration with source_id=0. This is further confirmed in each DynamicTrackBox, each having a modification_flags value of 0x00800000 to indicate to players or readers that the same track configuration as in previous fragments applies. It is noted that for track "i", the 'stsd' and 'meta' boxes (1030-22 and 1030-23) are repeated to guarantee random access when starting playing the presentation at the time corresponding to fragments 1000-4 or 1001-4.

It is noted that while the example in FIG. 10 illustrates the overriding of all the tracks declared initially in the 'moov' box, some embodiments of the invention still applies if only a subset of the tracks is overridden (for example only track "i" or only track "j"). In such a case, the DynamicMovieBox and DynamicTrackBox boxes indicate which tracks are modified but there is no need to include a DynamicTrackBox box for the tracks that are not modified.

It is noted that regardless of the examples of FIGS. 7 to 10, when the presentation is encapsulated as one track fragment per 'moof' box, the media file then contains, for a given time interval, several movie fragments, at least two containing one DynamicMovieBox box (as illustrated in FIG. 8). To avoid any ambiguity for readers or players for determining that, within this set of DynamicMovieBox, they relate to a same presentation or not, the DynamicMovieBox can be extended with an additional parameter, called for example bundle_id. This parameter can be used to identify a set of DynamicMovieBox boxes that relate to the same presentation. Indeed, the use of source_id by reader or player to determine whether a DynamicMovieBox and its sub-boxes indicating a track configuration change should be processed or not rely on source_id. When a bundle_id is present, this is the pair (bundle_id, source_id) that should be considered (unchanged values for these two parameters) instead of the source_id alone.

Embodiments for Multiple DynamicMovieFragments

This embodiment addresses one limitation of the above embodiment where the DynamicMovieBox 600 contains only a source_id parameter and no bundle_id parameter. In this embodiment, the syntax of the DynamicMovieBox is extended and reuses most of the parameters defined and described above (e.g. 601 on FIG. 6a and FIG. 6b). This extended DynamicMovieBox would also support use cases described in reference to FIGS. 7, 9, 10 and would solve a possible limitation for use cases as on FIG. 8, as explained hereafter.

Figures 11A, 11B, 11C:
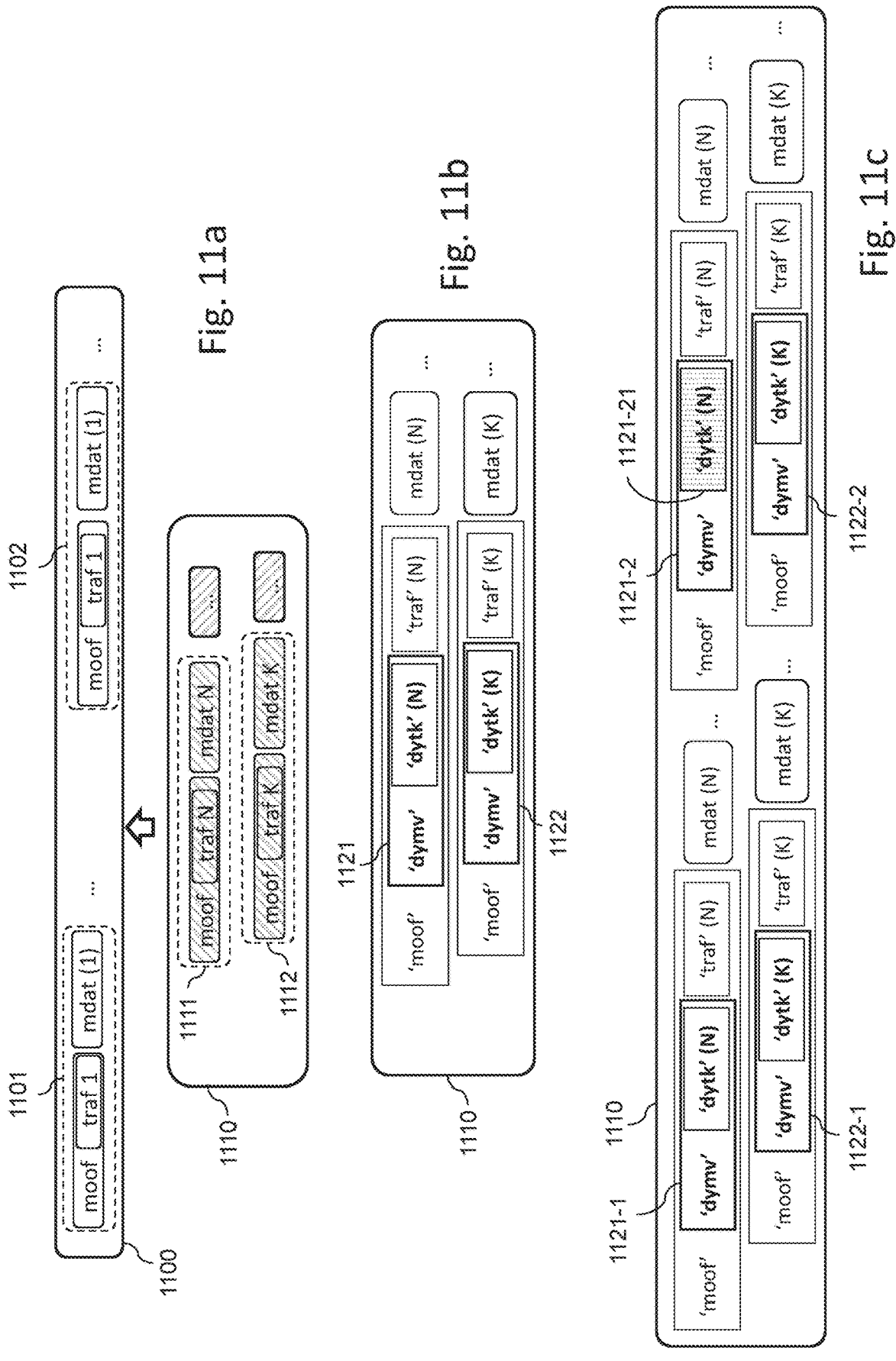
FIGS. 11a to 11c illustrate an example of track configuration change.

FIGS. 11a to 11c illustrate an example of track configuration change.

FIG. 11a illustrates an example of presentation update, or adding or splicing dynamic tracks into a presentation which may lead to a change in the track configuration. For the sake of illustration, movie fragments 1101 and 1102 correspond to a first presentation 1100 with its track configuration (e.g. a sequence of movie and track fragments with track_ID=1). Movie fragments 1111 and 1112 correspond to a second presentation 1110 with its track configuration to splice or to append at a given time in the first sequence 1100. Still for the sake of illustration, presentation 1110 consists in a sequence of movie fragments comprising movie fragments 1111 and 1112. It is to be noted that each movie fragment could also contain several track fragments ('traf'), but only one is illustrated for the sake of clarity.

FIG. 11b illustrates how movie fragments 1111 and 1112 of the second presentation 1110 in FIG. 11a may be modified by an encapsulation module before being inserted or spliced into a sequence, for example the first sequence 1100 in FIG. 11a. It is to be noted here that in order to comply with the original fragmentation of the second presentation 1110, one dynamic movie box 'dymv' is added for each movie fragment (e.g. dynamic movie box 'dymv' 1121 for movie fragment 1111 and dynamic movie box 'dymv' 1122 for movie fragment 1112). This is where an additional parameter like, for example the bundle_id parameter, can be useful in a DynamicMovieBox. By adding this parameter, the two DynamicMovieBox 1121 and 1122 can be associated with a presentation and as describing parts or components of this presentation. This is an indication that the new track configuration corresponds to the addition of each track configuration described in each of these parts. It is to be noted, depending on the value of the source_id in the DynamicMovieBox, that the track configuration for the current fragment may also contain track configuration from movie fragment without a DynamicMovieBox. For consistency, when a DynamicMovieBox of a given fragment has its source_id set to 0, the other DynamicMovieBox in the same fragment (possibly in a different 'moof') should have their source_id also set to 0. The name bundle_id is just an example, it could also be named "subset_id", "component_id", "partition_id", or any other name dedicated to indicate an identifier for tracking partial configuration changes within a source_id. With these parameters, the tracks declared or modified in a DynamicMovieBox may have the same configuration for several consecutive movie fragments. The source_flags parameter of the DynamicMovieBox, when indicated by an encapsulation module, allows a file parser to detect that a DynamicMovieBox is a repetition of the previous DynamicMovieBox with the same values for source_id and bundle_id. For a same value of source_id, if multiple dynamic tracks or movie-related metadata (e.g. user data or meta box) are modified or declared in more than one DynamicMovieBox, each of these DynamicMovieBoxes uses a different bundle_id. This may allow indicating that a part of the presentation has changed.

FIG. 11c illustrates an example in which a part of the track configuration of the presentation has changed to insert presentation 1110. According to this example the configuration for the track N (referenced 1121-21) in the DynamicMovieBox 1121-2 has changed. This partial configuration may be indicated either at DynamicTrackBox level (1121-21), using the modification flags, or at the DynamicMovieBox level (1121-2) by assigning a new value of bundle_id for this DynamicMovieBox 1121-2. This can be useful to indicate that a part of the track configuration has changed between movie fragments of a track without the need to process the whole track configuration for both tracks N (1121-2) and K (referenced 1122-2), but only for the one with a bundle_id change (i.e. DynamicMovieBox 1121-2 in the example). Having this information in DynamicMovieBox allows detection of a partial configuration (track or moov-level) change by readers (step 504 in FIG. 5) without inspecting the DynamicTrackBox(es) contained in a DynamicMovieBox. For example, when a pair (source_id, bundle_id) does not change and the source_flags further indicates no change, the reader can safely skip the DynamicTrackBoxes. It is to be noted that bundle_id may also correspond to a configuration change that is not exactly a track configuration change, for example high level changes in the 'moov' box like metadata in a MetaBox ('meta') or user data in a UserDataBox ('udat').

Figure 12:
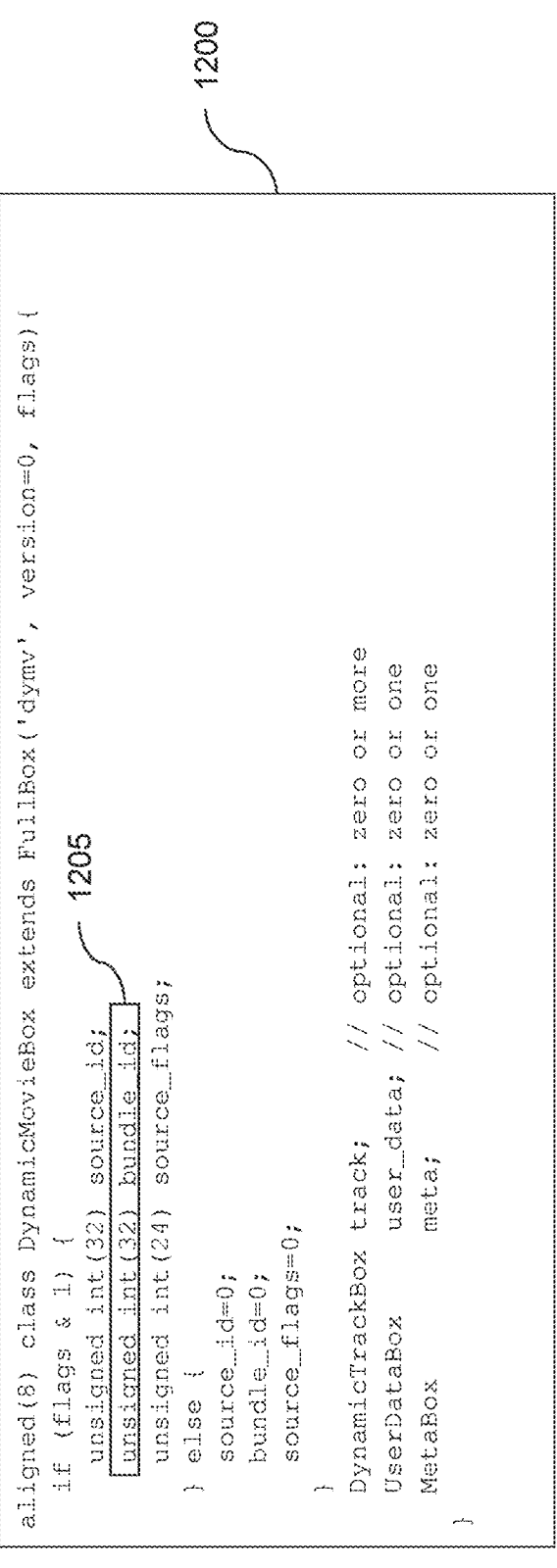
FIG. 12 illustrates an example of an updated syntax for the DynamicMovieBox.

FIG. 12 illustrates an example of an updated syntax for the DynamicMovieBox to handle cases according to which two or more dynamic tracks are inserted in an initial movie or during a splice period, each in their own movie fragment. According to this embodiment, DynamicMovieBox 1200 contains a parameter to identify parts within a given source_id, for example denoted bundle_id (referenced 1205 in FIG. 12). As described with reference to DynamicMovieBox 600 in FIG. 6a, a DynamicMovieBox may contain zero or more DynamicTrackBox. It is to be noted that the use of DynamicMovieBox with source_id different from 0, without using any DynamicTrackBox, can be used to force a discontinuity between two movie fragments. The use of DynamicMovieBox with source_id equal to 0, without using any DynamicTrackBox, may be used to update MetaBox or UserDataBox.

Tracks declared or modified in a DynamicMovieBox may have the same configuration for several consecutive movie fragments. The source_flags parameter allows a file parser to detect that a DynamicMovieBox is a repetition of the previous DynamicMovieBox with the same values for source_id and bundle_id. For the same value of source_id, if multiple dynamic tracks or movie-related metadata (user data, meta) are modified or declared in more than one DynamicMovieBox, each of these DynamicMovieBoxes may use a different bundle_id. For this extended DynamicMovieBox (1200), the following flags may be defined:

0x000001 source-info-present if set, indicates that source information is present; if not set, source_id, bundle_id, and source_flags take the value 0 and 0x000002 in-splice if set, indicates that the tracks described in the DynamicMovieBox correspond to a content splice period and will soon move back to previous configuration. By monitoring this flag and the source_id field, the processing media pipeline can be optimized if desired (e.g. avoid unloading/reloading decoder resources for instance). This flag should not be set if source_id is 0. It is to be noted that encapsulation module could also use a flag in 'styp' to signal this, to simplify edition of files during concatenation.

It is to be noted that the presence or not of the bundle_id parameter 1205 could be controlled by a version of the DynamicMovieBox. For example, a version 0 (without the bundle_id) could be used in cases where there is only one 'moof' describing all inserted tracks (dynamic tracks) and a version 1 could be used in cases where there are multiple tracks to insert (dynamic tracks), these tracks being described in at least two movie fragments ('moof' boxes).

The semantics may be updated as follows:

source_id identifies the origin of the fragment. The value 0 may indicate that the source is the MovieBox and the DynamicMovieBox modifies the MovieBox. Other values may identify another source than the MovieBox and all tracks, UserDataBox, MetaBox, and any other properties defined in the MovieBox should be ignored, bundle_id provides an identifier for tracking partial configuration changes for a given source_id. It is to be noted that the bundle_id is typically needed when two or more dynamic tracks are inserted in initial movie or during a splice period, each in their own movie fragment. This allows a file reader to detect that the changes advertised for a given bundle have already been processed in a preceding movie fragment, and source_flags identify the modifications declared in this DynamicMovieBox compared to the previous DynamicMovieBox with the same value of source_id and bundle_id. The flags may be defined as follows:

0x000001 if set, indicates that one or more track configurations have changed,

0x000002 if set, indicates that the global (MovieBox-level) user data has changed, 0x000004 if set, indicates that the global (MovieBox-level) meta box has changed, and 0x800000 if set, indicates that the modifications are functionally equivalent to the previous DynamicMovieBox with the same source_id and bundle_id. When this flag is set, a file reader may safely skip processing the DynamicMovieBox if a previously parsed DynamicMovieBox has the same source_id and bundle_id. Otherwise (this is the first DynamicMovieBox parsed with this source_id and bundle_id values), this flag may be set but shall be ignored (i.e. considered as not set) by file readers.

When source_flags is not set (either explicitly or per the above rule) or has the value 0, the box should not be skipped. In this case, there is no information regarding modifications of child boxes compared to previous DynamicMovieBox and the entire content of the box must be re-evaluated.

When source_flags is not set to 0x000001, any DynamicTrackBox present in this DynamicMovieBox should have the 0x800000 modification_flags set.

It is to be noted that the source_id or bundle_id parameters can be encoded on a lower number of bits, for example 8 or 16 bits instead of 32 bits. Using 32 bits makes it consistent with the number of bits for track_ID in the TrackHeaderBox however, using 8 bits may be sufficient and makes it possible to reduce the description cost for dynamic tracks. The same applies to source_flags parameter: using 24 bits makes it consistent with the flags in the TrackHeaderBox however, using 8 bits (or 16) may be sufficient to indicate what changed in a track configuration and to reduce the description cost for dynamic tracks.

Figures 13, 14:
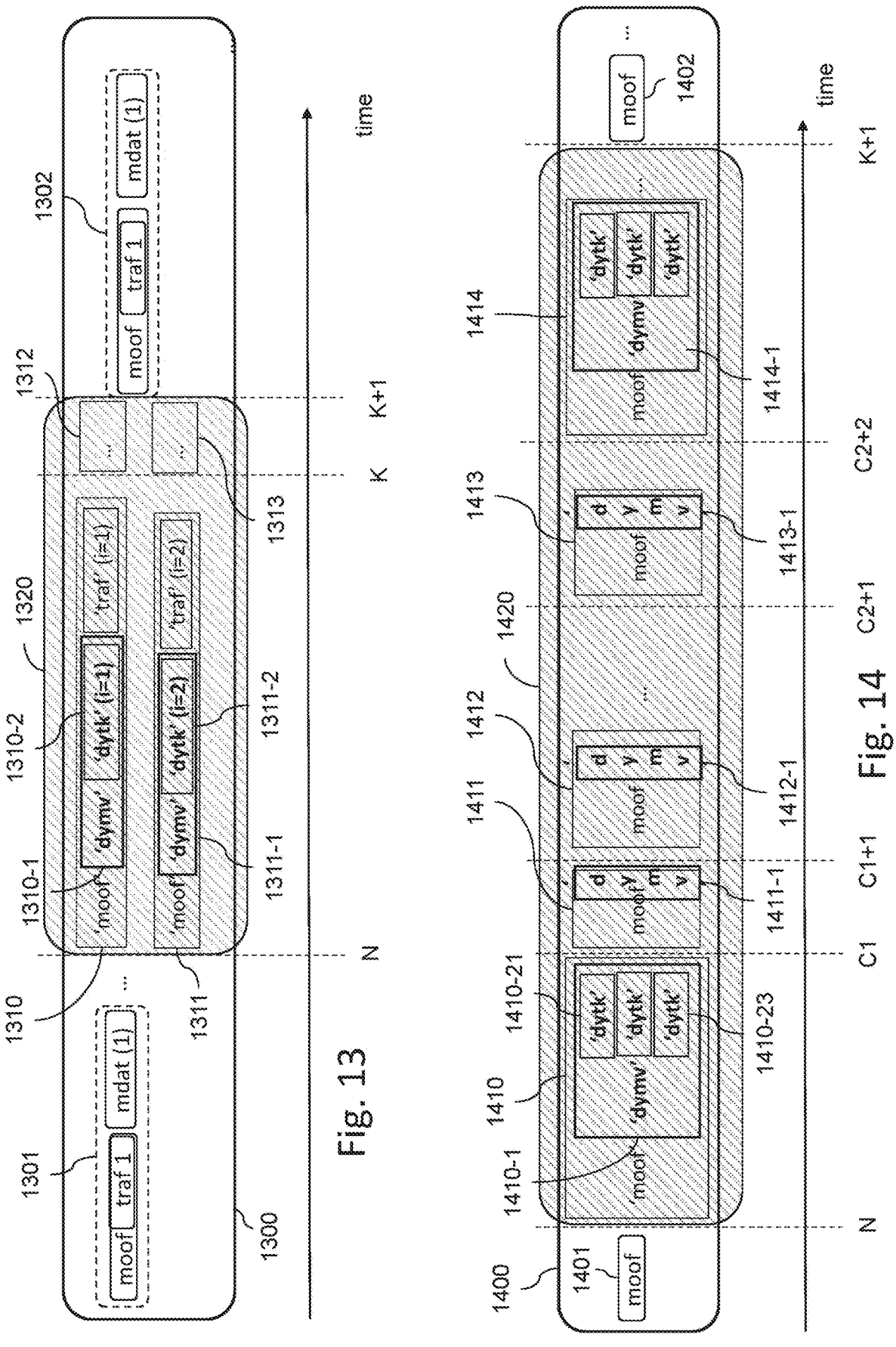
FIG. 13 illustrates an example of using the additional parameter bundle_id described by reference to FIG. 12 for splicing with configuration changes contained in separate movie fragments of a presentation.
FIG. 14 illustrates another example wherein the additional parameter bundle_id described by reference to FIG. 12 is not used for splicing audio-visual content in a single movie fragment, with configuration changes.

FIG. 13 illustrates an example of using the additional parameter bundle_id described by reference to FIG. 12 for splicing audio-visual content 1320 contained in separate movie fragments of a presentation 1300.

For the sake of illustration, presentation 1300 consists in one or more consecutive movie fragments (1301 or 1302) for one or more tracks (here only one track is represented with track_Id=1). The spliced content 1320 is contained in separate movie fragments for fragments from Ni to Ki, "i" representing each media (e.g. as a track described by a sequence of movie fragments like movie fragments 1310, 1311, 1312, or 1313). For the sake of clarity and conciseness, the corresponding 'mdat' boxes for these fragments are not illustrated. The movie fragments from N to K come each with a DynamicMovieBox 1310-1, 1311-1; or the ones in 1312 and 1313 that are not represented, having its flags set to the value 3, indicating source_id_present and in-splice.

The values for the source_id in these DynamicMovieBox are set to a value greater than 0 to indicate that the track configuration from the MovieBox is replaced by the track configuration. Each DynamicMovieBox has a bundle_id value set to "i". Finally, the source_flags is set to 0x800000 (or 0x800001 as a hint to reader that the track configuration changed). Then, each DynamicMovieBox contains a DynamicTrackBox (e.g. DynamicTrackBox 1310-2 or 1311-2) with track_ID indicated in their DynamicTrackHeaderBox (not represented) and a SampleDescriptionBox ('stsd', not represented). The track_IDs can take any value (new values or reuse those from the MovieBox and its sub-boxes) provided that each track in the spliced content has a different track identifier value. These DynamicTrackHeaderBox have their modification_flags set to 0x800000. This modification flags will result for players processing the file with spliced content in a processing of the dynamic movie or track boxes on their first occurrence (e.g. fragments 1310 and 1311) and to skip the following ones (up to fragment K represented with references 1312 and 1313). Then, from fragment at K+1, corresponding to a switch back to the previous configuration, there is no need for any DynamicMovieBox if this previous configuration is the same configuration as in the MovieBox ('moov').

FIG. 14 illustrates another example wherein the additional parameter bundle_id described by reference to FIG. 12 is not used for splicing audio-visual content in a single movie fragment, with configuration changes (for clarity the data part of the movie fragments are not illustrated).

For the sake of illustration; a first presentation 1400 contains a sequence of movie fragments represented by references 1401 and 1402. At a given time, for example time N, a new content referenced 1420 is inserted in this first presentation. This new content comes as a sequence of movie fragments with T track fragments, T being the number of tracks representing the new content 1420. In the example illustrated in FIG. 14, the number of tracks T is set to 3, for example one video track, one audio track, and one subtitle track, but it could be several tracks of the same media type, for example 2 video tracks or 2 audio tracks in different languages. Each track of content to splice 1420 comes as a sequence of movie fragments like 1410, 1411 to 1414, each fragment containing all the track fragments as detailed for movie fragment 1410 where the MovieFragmentBox contains a DynamicMovieBox 'dymv' 1410-1 itself containing three DynamicTrackBoxes 'dytk' referenced 1410-21 to 1410-23, and three TrackFragmentBoxes (one 'traf' per track, not represented). Following movie fragments 1411 to 1414 also contain a DynamicMovieBox 'dymv' that itself contains three DynamicTrackBoxes 'dytk' and three TrackFragmentBoxes. It is explained hereafter how the parameters in the 'dymv' and 'dytk' boxes can be used to indicate configuration changes along time. In particular, this example illustrates the changes at the beginning of the splicing (time N) but also within the spliced content: a configuration change happening at C1 and a switch back to previous configuration after C2. These variations can be expressed as follows:

for fragments in [N, C1[, the corresponding movie fragment 1410 and possibly following other movie fragments (not represented), contain a DynamicMovieBox 1410-1 with the following parameters values: the flags is set to 3 (source-id-present and in-splice), the source_id is set to 1 (indicating that configuration from the MovieBox does not apply for these movie fragments), the bundle_id, if present is set to 0 (it does not play any role in this example), and the source_flags may be set to 0x800000 or 0x800001 as a hint to players that a change in the track configuration occurred. Setting value 0x000001 is optional because the first occurrence of the dynamic movie box 1410-1 would be processed and the following ones would be skipped because the values for source_id and bundle_id do not change between N and C1. The dynamic track boxes 1410-21 to 1410-23 have the following values for their parameters. First, the track_ID values may be any values, even track_ID values used in the MovieBox or its sub-boxes, because source_id is greater than 0 (invalidating, overriding, or changing the 'moov' configuration). Of course, each track among the 3 may have its own track_ID. The set of track_ID values may be referred to as the splice_track_IDs. These values are set in each DynamicTrackHeaderBox (not represented) of each 'dytk' box and referred to in each TrackFragmentBox describing the samples of each of the 3 tracks. Each DynamicTrackHeaderBox (not represented) has its modification_flags set to 0x800000. Each DynamicTrackBox 1410-21 to 1410-23) contains a Sample Description Box ('stsd') providing detailed information about the coding type used, and any initialization information needed for that coding. This may be used to reset the decoders, if needed.

for fragment at C1 (movie fragment 1411), a sample configuration change occurs. Fragment C1 has a DynamicMovieBox 1411-1 that has the same values as the ones in 1410-1 (i.e. flags=3 (source-id-present and in-splice), source_id=1, bundle_id=0, source_flags=0x800000 (or 0x800001 as a hint)). The sample configuration change is indicated in the DynamicTrackBoxes (not represented) where a change occurs. For example, each dynamic track has a 'stsd' box (to guarantee random access) and a change of 'stsd' is indicated in their corresponding DynamicTrackHeaderBox (not represented) with a modification_flags set to 0x000002 (and 0x800000 for dynamic tracks with no 'stsd' change). This value 0x000002 forces players to process the dynamic track boxes having this value even if the source_id and bundle_id values are the same as in previous fragments (1410). The track identifiers are splice_track_IDs.

for fragments in [C1+1, C2] (one or more) no changes occur. This is indicated by the encapsulation module in the DynamicMovieBox 1412-1 and 1413-1 that have the same values as the ones in DynamicMovieBox 1410-1 or 1411-1 (i.e. flags=3 (source-id-present and in-splice), source_id=1, bundle_id=0, source_flags=0x800000 (or 0x800001 as a hint). Each DynamicTrackBox in DynamicMovieBox 1412-1 (not represented) contains a 'stsd' (to guarantee random access) that is the same as in fragment 1411. This is indicated in their corresponding DynamicTrackHeaderBox (not represented) with a modification_flags set to 0x800002. The track identifiers are splice_track_IDs.

for fragment at C2+1, movie fragment 1413 contains one DynamicMovieBox 1413-1 with flags=3 (source-id-present and in-splice), source_id=1, bundle_id=0, and source_flags=0x000001. This box contains three DynamicTrackBox (tracks with splice_track_Ids as identifiers), each with one 'stsd'. The corresponding DynamicTrackHeaderBox have their modification_flags set to 0x000002 to indicate a configuration change (in the sample description that switches back to the configuration as in [N, C1]). Each, or a subset, of the dynamic tracks in the set of T tracks may have this configuration change. For tracks with no changes, the modification_flags can be set to 0x800002 or 0x800000. The track identifiers are splice_track_IDs.

for fragments in [C2+2, K] represented by one or more fragments 1414, each fragment 1414 contains one DynamicMovieBox 1414-1 with flags=3 (source-id-present and in-splice), source_id=1, bundle_id=0, and source_flags=0x000001. This box contains three DynamicTrackBox (tracks with splice_track_Ids as identifiers), each with one 'stsd'. The corresponding DynamicTrackHeaderBox have their modification_flags set to 0x800002 to indicate that no change occurred between fragment C2+1 and fragment C2+2, etc. until fragment K.

finally, from fragment K+1 (referenced 1402), the presentation switches back to the original configuration (in the MovieBox for presentation 1400). There is no need here for a DynamicMovieBox if the configuration to apply is the same configuration as the one declared in the 'moov' can be moved (which is the case in example 1402 with presentation 1400). The track_IDs are then those declared in the TrackHeaderBox within the 'moov' box.

Usage With Dependent or Predicted Fragments

The proposed DynamicMovieBox 1200 and its sub-boxes may be combined with movie fragments that would depend on reference movie fragments. Assuming that so-dependent movie fragments would be signaled by a specific version of the MovieFragmentHeaderBox, for example as follows:

```
aligned(8) class MovieFragmentHeaderBox extends FullBox('mfhd',
version, 0){
    unsigned int(32) sequence_number;
}
```

If version is not 0, any SampleGroupDescriptionBox, DynamicMovieBox, UserDataBox, or MetaBox defined in the last movie fragment, or in the last TrackFragment in the last movie fragment, whose Movie FragmentHeaderBox version is 0 also applies for this movie fragment, and there should not be any SampleGroupDescriptionBox, DynamicMovieBox, UserDataBox, or MetaBox defined for this movie fragment.

It is to be noted that instead of a version, a specific flags value could be defined instead, to avoid any conflict with versioning of the Movie FragmentHeaderBox (for example to encode a sequence_number on 64 bits). The above statement would apply similarly.

Figure 15:
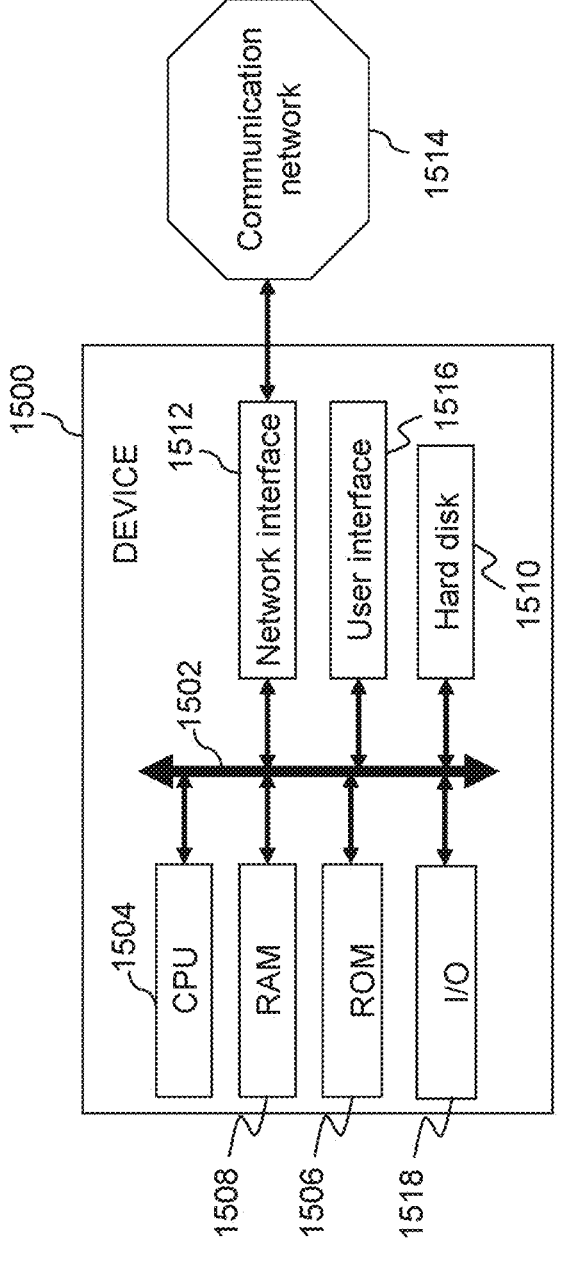
FIG. 15 schematically illustrates a processing device configured to implement at least one embodiment of the present invention.

Example of Hardware to Carry Out Steps of the Method of Embodiments of the Invention FIG. 15 is a schematic block diagram of a computing device 1500 for implementation of one or more embodiments of the invention. The computing device 1500 may be a device such as a micro-computer, a workstation, or a light portable device. The computing device 1500 comprises a communication bus 1502 connected to:

a central processing unit (CPU) 1504, such as a micro-processor;

a random access memory (RAM) 1508 for storing the executable code of the method of embodiments of the invention as well as the registers adapted to record variables and parameters necessary for implementing the method for encapsulating, indexing, de-encapsulating, and/or accessing data, the memory capacity thereof can be expanded by an optional RAM connected to an expansion port for example;

a read only memory (ROM) 1506 for storing computer programs for implementing embodiments of the invention;

a network interface 1512 that is, in turn, typically connected to a communication network 1514 over which digital data to be processed are transmitted or received. The network interface 1512 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1504;

a user interface (UI) 1516 for receiving inputs from a user or to display information to a user;

a hard disk (HD) 1510; and/or an I/O module 1518 for receiving/sending data from/to external devices such as a video source or display.

The executable code may be stored either in read only memory 1506, on the hard disk 1510 or on a removable digital medium for example such as a disk. According to a variant, the executable code of the programs can be received by means of a communication network, via the network interface 1512, in order to be stored in one of the storage means of the communication device 1500, such as the hard disk 1510, before being executed.

The central processing unit 1504 is adapted to control and direct the execution of the instructions or portions of software code of the program or programs according to embodiments of the invention, which instructions are stored in one of the aforementioned storage means. After powering on, the CPU 1504 is capable of executing instructions from main RAM memory 1508 relating to a software application after those instructions have been loaded from the program ROM 1506 or the hard-disc (HD) 1510 for example. Such a software application, when executed by the CPU 1504, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described here-inabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encapsulating media data of a plurality of presentations in at least one media file based on ISOBMFF, the method comprising:

obtaining a portion of media data of a first presentation, denoted a first portion, the first presentation consisting of a first set of tracks, encapsulating first metadata describing tracks of the first set of tracks and encapsulating the first portion of the media data of the first presentation into one or more first media fragments, obtaining a portion of media data of a second presentation, denoted a second portion, the second presentation consisting of a second set of tracks, and encapsulating second metadata describing tracks of the second set of tracks into one or more second media fragments following the first media fragments and encapsulating the second portion of the media data of the second presentation into the one or more second media fragments, wherein the second metadata include an indication to signal that the second set of tracks does not comprise at least one track as described in the encapsulated first metadata.

2. The method of claim 1, wherein the second metadata include an indication to signal that a value of a least at one parameter of the description of at least one track belonging to the first and the second sets of tracks is different in the first metadata and in the second metadata.

3. The method of claim 1, wherein the second set of tracks does not comprise at least one track described in the first metadata.

4. The method of claim 1, wherein the second set of tracks comprises at least one track that is not described in the first metadata.

5. The method of claim 1, wherein the at least one media file comprises a metadata part for encapsulating metadata common to all media data encapsulated in the at least one media file, the first metadata being encapsulated in the metadata part.

6. The method of claim 1, wherein at least one of the one or more first media fragments comprise a metadata part for encapsulating metadata common to all media data encapsulated in the at least one of the one or more first media fragments, the first metadata being encapsulated in the metadata part of the at least one of the one or more first media fragments.

7. The method of claim 1, wherein the indication to signal that the second set of tracks does not comprise at least one track as described in the encapsulated first metadata comprises an indicator to indicate that the second set of tracks is a new set of tracks.

8. The method of claim 1, wherein the indication to signal that the second set of tracks does not comprise at least one track as described in the encapsulated first metadata comprises an indicator to indicate that the second set of tracks has already been described and that at least one parameter of the description of the second set of tracks has changed.

9. The method of claim 1, wherein the second metadata further includes an indication to signal that the one or more second media fragments can be parsed independently from the first fragment.

10. The method of claim 1, wherein the fragments are Common Media Application Format, CMAF, segments or fragments or ISO Base Media File Format, ISOBMFF, segments or fragments.

11. A method for parsing media data of a plurality of presentations, the media data being encapsulated based on ISOBMFF as a plurality of fragments of one or more media files, the method being carried out by a client and comprising:

obtaining first metadata describing tracks of a first set of tracks of a first presentation comprising one or more first media fragments, obtaining at least one second media fragment comprising encapsulated second metadata and encapsulated media data, the second metadata describing tracks of a second set of tracks of a second presentation, the encapsulated media data being media data of the second presentation and the at least one second media fragment following a first media fragment comprising media data of the first presentation, parsing at least a part of the second metadata, and upon determining that the second metadata include an indication to signal that the second set of tracks does not comprise at least one track as described in the encapsulated first metadata, updating a track description to be used for parsing the encapsulated media data.

12. The method of claim 11, wherein updating the track description comprises parsing at least another part of the second metadata, updating the track description being based on metadata of the at least another part of the second metadata.

13. The method of claim 12, wherein the at least another part of the second metadata comprises a description of at least one track not described in the first metadata.

14. The method of claim 12, wherein the at least another part of the second metadata comprises a new value of at least one parameter of a description of at least one track described in the first metadata.

15. The method of claim 11, wherein the one or more media files comprise a metadata part for encapsulating metadata common to all media data encapsulated in the one or more media files, the first metadata being encapsulated in the metadata part.

16. The method of claim 11, wherein the first metadata are obtained from a media fragment.

17. The method of claim 11, further comprising:

obtaining at least one third media fragment comprising encapsulated third metadata and encapsulated media data, the third metadata describing tracks of a third set of tracks of a presentation comprising the media data encapsulated in the at least one third media fragment comprising the third metadata, parsing at least a part of the third metadata, and upon determining that the third metadata include an indication to signal that the description of the third set of tracks is similar to a description of a set of tracks determined previously, skipping parsing of another part of the third metadata and using a current description of a set of tracks for parsing media data of the at least one third media fragment comprising the encapsulated third metadata.

18. A non-transitory computer-readable storage medium storing instructions of a computer program for implementing the method according to claim 1.

19. A processing device comprising a processing unit configured for carrying out each step of the method according to claim 1.

20. A non-transitory computer-readable storage medium storing instructions of a computer program for implementing the method according to claim 11.

* * * * *